(12) United States Patent
Wei

(10) Patent No.: US 12,409,706 B2
(45) Date of Patent: Sep. 9, 2025

(54) INTEGRATED HEAT PUMP AIR-CONDITIONING AND THERMAL MANAGEMENT SYSTEM WITH FIVE WAY VALVES AND A CONTROL METHOD

(71) Applicant: Jiangxi Xindian Automobile Climate System Co., Ltd., Nanchang (CN)

(72) Inventor: Wenhong Wei, Nanchang (CN)

(73) Assignee: Jiangxi Xindian Automobile Climate System Co., Ltd., Nanchang (CN)

( * ) Notice: Subject to any disclaimer, the term of this patent is extended or adjusted under 35 U.S.C. 154(b) by 184 days.

(21) Appl. No.: 18/361,871

(22) Filed: Jul. 30, 2023

(65) Prior Publication Data

US 2024/0140171 A1    May 2, 2024

(51) Int. Cl.
   *B60H 1/00*    (2006.01)
(52) U.S. Cl.
   CPC ..... *B60H 1/00899* (2013.01); *B60H 1/00278* (2013.01); *B60H 1/00385* (2013.01); *B60H 1/00485* (2013.01); *B60H 1/00885* (2013.01); *B60H 1/00428* (2013.01)
(58) Field of Classification Search
   CPC ............ B60H 1/00899; B60H 1/00278; B60H 1/00385; B60H 1/00485; B60H 1/00885; B60H 1/00428; B60H 1/00921; B60H 1/32284; B60H 1/00392; B60H 1/2221; B60H 1/3227; B60H 2001/00307; B60H 2001/00928
   See application file for complete search history.

(56) References Cited

U.S. PATENT DOCUMENTS

2022/0069387 A1* 3/2022 Maeda ...................... F01P 7/16

FOREIGN PATENT DOCUMENTS

| CN | 206420665 U |   | 8/2017  |               |
|----|-------------|---|---------|---------------|
| CN | 210628381 U |   | 5/2020  |               |
| CN | 112477699 A | * | 3/2021  |               |
| CN | 114475152 A | * | 5/2022  |               |
| CN | 216742986 U |   | 6/2022  |               |
| CN | 110481272 B | * | 12/2022 | ... B60H 1/00278 |

OTHER PUBLICATIONS

CN114475152 translation (Year: 2022).*

* cited by examiner

Primary Examiner — Joseph F Trpisovsky
(74) Attorney, Agent, or Firm — Addison D. Ault; IPGentleman Intellectual Property Services, LLC

(57) ABSTRACT

The invention provides an integrated heat pump air conditioning and heat management system with a five way valve and a control method thereof, including a refrigerant circulation system, a coolant circulation system, a first heat management system and a second heat management system; The refrigerant circulation system is connected with the coolant circulation system to transfer the heating and cooling capacity of the refrigerant to the coolant circulation system; The first thermal management system is connected with the coolant circulation system to cool or heat the battery pack; The second thermal management system is connected with the coolant circulation system to cool the motor; The second thermal management system also emits waste heat from the coolant circulation system and the first thermal management system into the air. The system and its control method of the invention combine a variety of heat management functions, and the control method is scientific.

8 Claims, 31 Drawing Sheets

INTEGRATED HEAT PUMP AIR-CONDITIONING AND THERMAL MANAGEMENT SYSTEM WITH FIVE WAY VALVES AND A CONTROL METHOD

CROSS-REFERENCE TO RELATED APPLICATIONS

The application claims priority to Chinese patent application No. 2022113200477, filed on Oct. 27, 2022, the entire contents of which are incorporated herein by reference.

TECHNICAL FIELD

The invention relates to the technical field of air conditioning and thermal management system, in particular to an integrated heat pump air conditioning and thermal management system with a five-way valve and a control method thereof.

BACKGROUND

At present, with the rapid development of new energy vehicles, in order to solve the problem of short driving range of pure electric vehicles, people put forward higher requirements for the energy saving, lightweight, modular, comfort and durability of vehicle air conditioning and thermal management system, which involve many functional and performance elements.

Among the existing technologies, the technology of integrated air conditioning and thermal management system is put forward. This technology is an important direction and trend of the development of new energy vehicle air conditioning and thermal management system because of its advantages of convenient layout, complete functions, high efficiency and energy saving, free control and easy installation and maintenance. In addition, the technology, but also can be widely used in the base station equipment such as air conditioning, heat energy storage or charging pile management or products, through the battery thermal management system, motor, electric drive and electric control parts of more than one function such as heating, cooling, water from the circulation or requirements, satisfy clients' demand for energy conservation and environmental protection, intelligent control and other aspects.

In the existing technology, however, the application of heat pump air conditioning and heat management system, exists the following problems, such as various parts, especially the refrigerant piping, coolant pipe is complex, bad arrangement, high thermal management system of power, COP value is low, automotive air conditioning and battery, motor, electric drive, electric control and so on more than one component thermal management control function is not neat, poor performance, and does not meet the light weight, assembly, maintainability, durability and other shortcomings.

SUMMARY

In view of this, the invention provides an integrated heat pump air conditioning and thermal management system with five-way valve and its control method, aiming to solve the existing integrated air conditioning and thermal management system of many parts, complex pipelines and uneven thermal management control functions.

On the one hand, the invention provides an integrated heat pump air conditioning and thermal management system with 3 five-way valves, characterized by comprising: a refrigerant circulation system (A), a coolant liquid circulation system (B), a first thermal management system (C) and a second thermal management system (D), wherein the refrigerant circulation system (A) is connected to the coolant liquid circulation system (B) to transfer heat and cold energy of a refrigerant to the coolant liquid circulation system (B);

the first thermal management system (C) is connected to the coolant liquid circulation system (B), the first thermal management system (C) being used for cooling and heating a battery pack; and the second thermal management system (D) is connected to the coolant liquid circulation system (B), the second thermal management system (D) being used for cooling an electric motor, and the second thermal management system (D) also being used for dissipating waste heat from the coolant liquid circulation system (B) and the first thermal management system (C) into the air.

Further, characterized in that the refrigerant circulation system (A) comprises an electric compressor (1), a water-cooled condenser with receiver & drier (2), a first electronic expansion valve (3), a chiller (4), an expansion valve with solenoid valve (5), an evaporator (6), a blower (31), a first refrigerant tee (41) and a second refrigerant tee (42), wherein a discharge end of the electric compressor (1) is connected to an inlet end of the water-cooled condenser with receiver & drier (2), an outlet end of the water-cooled condenser with receiver & drier (2) is connected to an inlet end of the first refrigerant tee (41), an outlet end of the first refrigerant tee (41) is connected to an inlet end of the first electronic expansion valve (3), an outlet end of the first electronic expansion valve (3) is connected to an inlet end of chiller (4), an outlet end of chiller (4) is connected to an inlet end of the second refrigerant tee (42), an outlet end of the first refrigerant tee (41) is connected to an inlet end of the expansion valve with solenoid valve (5), an outlet end of the expansion valve with solenoid valve (5) is connected to an inlet end of the evaporator (6), an outlet end of the evaporator (6) is connected to an inlet end of the second refrigerant tee (42), and an outlet end of the second refrigerant tee (42) is connected to a suction end of the electric compressor (1).

Further, the coolant liquid circulation system (B) comprises a first electronic water pump (10), a ceramic water heater (11), a heater (12), a three-way water valve (13), a second five-way valve (15), a third five-way valve (16), a first five-way valve (17), a first water tee (53) and a third water tee (55), wherein an outlet end of the first electronic water pump (10) is connected to an inlet end of the ceramic water heater (11), and an outlet end of the ceramic water heater (11) is connected to an inlet end of the heater (12); an outlet end of the heater (12) is connected to an end a of the three-way water valve (13); an end b of the three-way water valve (13) is connected to one end of the second water tee (54); an end c of the three-way water valve (13) is connected to a coolant liquid inlet end of the water-cooled condenser with receiver & drier (2); a coolant liquid outlet end of the water-cooled condenser with receiver & drier (2) is connected to an inlet end 2 #of the second five-way valve (15); one end of the first water tee (53) is connected to an outlet end 1 #of the second five-way valve (15); an outlet end 3 #of the second five-way valve (15) is connected to one end of the third water tee (55); one end of the third water tee (55) is connected to an outlet end 1 #of the first five-way valve (17); an outlet end 5 #of the first five-way valve (17) is connected to a coolant liquid inlet end of the chiller (4); a coolant liquid outlet end of the chiller (4) is connected to an inlet end 4 #of the second five-way valve (15); an outlet end 5 #of the second five-way valve (15) is connected to an end 2 #of the third five-way valve (16); an end 3 #of the third five-way valve (16) is connected to one end of the first water tee (53); one end of the first water tee (53) is connected to one end of the second water tee (54); and one end of the third water tee (55) is connected to an inlet end of the first electronic water pump (10), and the blower (31) is arranged on the side of a vent of the evaporator (12).

Further, the first thermal management system (C) comprises a second electronic water pump (23), a battery pack (22) and a second water tee (54), wherein
an outlet end of the second electronic water pump (23) is connected to an inlet end of the battery pack (22); an outlet end of the battery pack (22) is connected to an inlet end 4 #of the first five-way valve (17); and one end of the second water tee (54) is connected to the second electronic water pump (23).

Further, the second thermal management system (D) comprises a third electronic water pump (21), a low-temperature radiator (18), an electronic fan (32), a fourth water tee (56), a water replenishing kettle (19), an electric motor and related
element (20) and a fifth water tee (57), wherein
an outlet end of the third electronic water pump (21) is connected to an inlet end 2 #of the first five-way valve (17); an outlet end 3 #of the first five-way valve (17) is connected to an inlet end 4 #of the third five-way valve (16); an outlet end 5 #of the third five-way valve (16) is connected to an inlet end of the low-temperature radiator (18); an outlet end of the low-temperature radiator (18) is connected to one end of the fourth water tee (56); the outlet end of the low-temperature radiator (18) is connected to one end of the water replenishing kettle (19); the other end of the water replenishing kettle (19) is connected to one end of the fifth water tee (57); an outlet end 1 #of the third five-way valve (16) is connected to one end of the fourth water tee (56); one end of the fourth water tee (56) is connected to an inlet end of the electric motor and related element (20); an outlet end of the electric motor and related element (20) is connected to one end of the fifth water tee (57); one end of the fifth water tee (57) is connected to an inlet end of the third electronic water pump (21); and the electronic fan (32) is arranged on the side of a vent of the low-temperature radiator (18).

On the other hand, the invention also provides a control method of an integrated heat pump air conditioning and thermal management system with a five-way valve, which is implemented by using the integrated heat pump air conditioning and thermal management system with a five-way valve, including:
Further, setting a plurality of operating modes according to user requirements, and controlling operating states of the integratable heat pump air-conditioning and thermal management system with five-way valves on the basis of the determined different operating modes.
Further, in setting a plurality of operating modes according to user requirements, passenger compartment demand, battery demand and electric motor module demand are obtained respectively, and different operating modes are set according to the different passenger compartment demand, battery demand and motor and related element demand obtained, wherein the motor and related element demand refers to all-in-one demand of an electric motor, an electronic control module, an ACDC module and a DCAC module.

Further, in the passenger compartment demand, 0 represents no demand or ventilation, 2 represents heating, 3 represents cooling, and 4 represents heating and dehumidification;
in the battery demand, 0 represents no demand, 1 represents temperature equalization, 2 represents heating, and 3 represents cooling;
in the electric motor module demand, 0 represents no demand, and 1 represents heat dissipation; and
the operating modes set according to the different passenger compartment demand, battery demand and electric motor module demand are mode 1 to mode 17' respectively.

Further, the mode 1 to mode 17' that are set are specified as:
mode 1: passenger compartment demand 0, battery demand 0, and electric motor module demand 1; (Not used the motor waste heat);
mode 1': passenger compartment demand 0, battery demand 0, and electric motor module demand 1; (Utilization of motor waste heat);
mode 2: passenger compartment demand 2, battery demand 0, and electric motor module demand 1; (heat pump);
mode 2': passenger compartment demand 2, battery demand 0, and electric motor module demand 1; (Water ceramic heater);
mode 3: passenger compartment demand 3, battery demand 0, and electric motor module demand 1;
mode 4: passenger compartment demand 4, battery demand 0, and electric motor module demand 1; (Same as mode 3);
mode 4': passenger compartment demand 4, battery demand 0, and electric motor module demand 1; (Parallel connection of electric drive for heater);
mode 5: passenger compartment demand 0, battery demand 1, and electric motor module demand 1; (Parallel connection of battery & electric drive);
mode 5': passenger compartment demand 0, battery demand 1, and electric motor module demand 1; (Battery & electric drive in series);
mode 6: passenger compartment demand 2, battery demand 1, and electric motor module demand 1; (heat pump);
mode 6': passenger compartment demand 2, battery demand 1, and electric motor module demand 1; (Water ceramic heater);
mode 7: passenger compartment demand 3, battery demand 1, and electric motor module demand 1;
mode 8: passenger compartment demand 4, battery demand 1, and electric motor module demand 1; (Same as mode 7);
mode 8': passenger compartment demand 4, battery demand 1, and electric motor module demand 1; (Parallel connection of electric drive for heater);
mode 9: passenger compartment demand 0, battery demand 2, and electric motor module demand 1; (heat pump);
mode 9': passenger compartment demand 0, battery demand 2, and electric motor module demand 1; (Water ceramic heater);

mode 10: passenger compartment demand 2, battery demand 2, and electric motor module demand 1; (heat pump);

mode 10': passenger compartment demand 2, battery demand 2, and electric motor module demand 1; (Water ceramic heater);

mode 11: passenger compartment demand 3, battery demand 2, and electric motor module demand 1; (Parallel connection of battery & electric drives);

mode 11': passenger compartment demand 3, battery demand 2, and electric motor module demand 1; (Batter & electric drive in series);

mode 12: passenger compartment demand 4, battery demand 2, and electric motor module demand 1; (Same as mode 11);

mode 12': passenger compartment demand 4, battery demand 2, and electric motor module demand 1; (Same as mode 11');

mode 13: passenger compartment demand 0, battery demand 3, and electric motor module demand 1; (Fast charging mode);

mode 13': passenger compartment demand 0, battery demand 3, and electric motor module demand 1; (Same as mode 5');

mode 14: passenger compartment demand 2, battery demand 3, and electric motor module demand 1; (Passenger compartment heat pump);

mode 14': passenger compartment demand 2, battery demand 3, and electric motor module demand 1; (Water ceramic heater);

mode 15: passenger compartment demand 3, battery demand 3, and electric motor module demand 1;

mode 16: passenger compartment demand 4, battery demand 3, and electric motor module demand 1; (Same as mode 15);

mode 16': passenger compartment demand 4, battery demand 3, and electric motor module demand 1; (Passive battery cooling);

mode 17: passenger compartment demand 0, battery demand 0, and electric motor module demand 0; (Coolant filling mode 1);

mode 17': passenger compartment demand 0, battery demand 0, and electric motor module demand 0; (Coolant filling mode 2);

Further, operating states of a refrigerant circulation system, a coolant liquid circulation system, a first thermal management system and a second thermal management system in the integratable heat pump air-conditioning and thermal management system with five-way valves are adjusted respectively on the basis of the mode 1 to mode 17' that are set.

Compared with the existing technology, the invention of the beneficial effect is that his own statement by setting the refrigerant cycle system, coolant liquid circulation system, the first thermal management system and a second thermal management system, ensure vehicle air conditioning system in heating, cooling and dehumidification mist, and many other functions and comfort under the premise of fully functional to satisfy the needs of users, and, The system of the invention can freely switch the working mode of the air conditioning system, so as to improve the performance, meet the requirements of various functions and comfort, and meet the requirements of energy saving, consumption reduction, easy assembly, easy maintenance, good durability, high reliability and lightweight, etc. The control method of the invention is intelligent, perfect and reasonable.

Further, the invention discloses the system and its control method, a variety of composite thermal management function, its perfect, reasonable and scientific control method, at the same time, by using the concept of integration module, which can effectively reduce dimension size of AC components, lightweight, reduce air conditioning system and thermal management system of refrigerant resistance and coolant resistance, Thus effectively improve the energy efficiency ratio of air conditioning system, to achieve the purpose of energy saving and consumption reduction, but also to ensure good cooling, heating and ventilation effects.

In the figures:
A. refrigerant circulation system; 1. Electric compressor; 2, water cooling condenser with receiver & drier; 3, the first electronic expansion valve; 4, chiller; 5, expansion valve with solenoid valve; 6. Evaporator; 41, the first refrigerant tee pipe; 42, the second refrigerant tee pipe; 31. Blower;

B. Coolant circulation system; 10, the first electronic water pump; 11. Water ceramic heater; 12. Heater; 13, three-way water valve; 15, the second five-way valve; 16, the third five-way valve; 17, the first five-way valve; 53, the first water tee pipe; 55, the third water tee pipe;

C. The first thermal management system; 23, the second electronic water pump; 22. Battery pack; 54, the second water tee pipe;

D. Second thermal management system; 21, the third electronic water pump; 18, low temperature radiator; 32. Electronic fan; 56, the fourth water tee pipe; 19. Kettle; 20. Motor and related components; 57, the fifth water tee pipe.

DETAILED DESCRIPTION OF THE EMBODIMENTS

The invention is described in detail by referring to the attached drawings and combining with embodiments.

Figure 1:
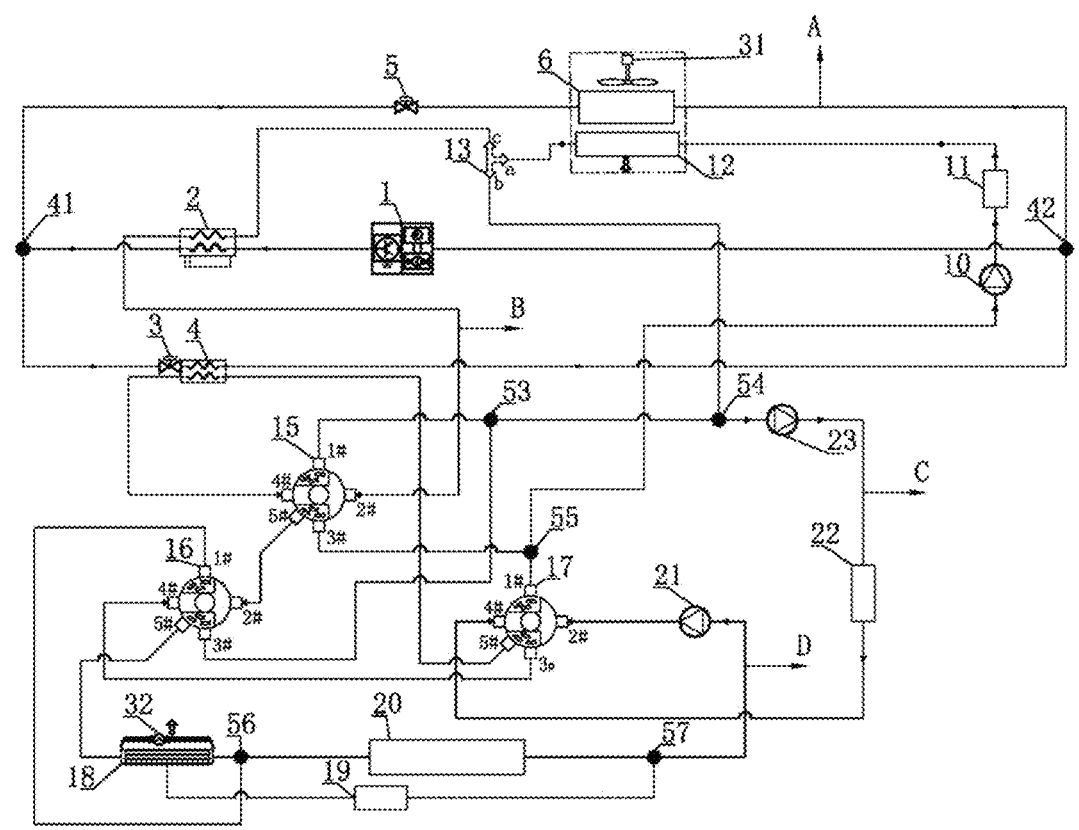
FIG. 1 is a schematic diagram of an integrated heat pump air conditioning and thermal management system with 3 five-way valves provided by the embodiment of the invention.

As shown in FIG. 1, this embodiment provides an integrated heat pump air conditioning and heat management system with five way valve, including refrigerant circulation system A, coolant circulation system B, first thermal management system C and second thermal management system D; The refrigerant circulation system A is connected with the coolant circulation system B to transfer the heating and cooling capacity of the refrigerant to the coolant circulation system B; The first thermal management system C is connected with the coolant circulation system B, and the first thermal management system C is used for cooling and heating the battery pack; The second thermal management system D is connected with the coolant circulation system B, and the second thermal management system D is used to cool the motor; The second thermal management system D is also used to dissipate waste heat from the coolant circulation system B and the first thermal management system C into the air.

Specifically, in practical applications, temperature or refrigerant pressure sensors can also be added at appropriate places.

Specifically, the refrigerant circulation system A transfers the heat quantity of the refrigerant to the coolant circulation system B through the water-cooled condenser with the receiver & drier 2; Refrigerant circulating system A transfers the cool quantity of refrigerant to coolant circulating system B through chiller 4; The second thermal management system D emits waste heat from the coolant circulation system B, the first thermal management system C and the second thermal management system D to the air through the low-temperature radiator 18 and the electronic fan 32.

Specifically, refrigerant circulation system A includes electric compressor 1, water-cooled condenser with receiver & drier 2, first electronic expansion valve 3, chiller 4, expansion valve with solenoid valve 5, evaporator 6, blower 31, first refrigerant tee 41 and second refrigerant tee 42; Among them, Specifically, the discharge end of the electric compressor 1 is connected with the inlet end of the water-cooled condenser with the receiver & drier 2, the outlet end of the water-cooled condenser with the receiver & drier 2 is connected with the inlet end of the first refrigerant three-way pipe 41, the outlet end of the first refrigerant three-way pipe 41 is connected with the inlet end of the first electronic expansion valve 3, and the outlet end of the first electronic expansion valve 3 is connected with the inlet end of the chiller 4, The outlet end of the chiller 4 is connected with the inlet end of the second refrigerant three-way pipe 42, the outlet end of the first refrigerant three-way pipe 41 is connected with the inlet end of the expansion valve with solenoid valve 5, the outlet end of the expansion valve with solenoid valve 5 is connected with the inlet end of the evaporator 6, the outlet end of the evaporator 6 is connected with the inlet end of the second refrigerant three-way pipe 42, and the outlet end of the second refrigerant three-way pipe 42 is connected with the suction end of the electric compressor 1.

Specifically, the coolant circulating system B comprises a first electronic water pump 10, a water ceramic heater 11, a heater 12, a three-way water valve 13, a second five way valve 15, a third five way valve 16, a first five way valve 17, a first water three-way pipe 53 and a third water three-way pipe 55; Among them, The outlet end of the first electronic water pump 10 is connected with the inlet end of the water ceramic heater 11, and the outlet end of the water ceramic heater 11 is connected with the inlet end of the heater 12; The outlet end of the water heater 12 is connected with the a end of the three-way water valve 13; The b end of the three-way water valve 13 is connected with one end of the second water three-way pipe 54; The c end of the three-way water valve 13 is connected with the coolant inlet end of the water-cooled condenser with the receiver & drier 2; The outlet end of the coolant of the water-cooled condenser with the receiver & drier 2 is connected with the inlet end 2 #of the second five way valve 15; One end of the first water three-way pipe 53 is connected with the outlet end 1 #of the second five way valve 15; The outlet end 3 #of the second five way valve 15 is connected with one end of the third water three-way pipe 55; One end of the third water three-way pipe 55 is connected with the outlet end 1 #of the first five way valve 17; The outlet end 5 #of the first five way valve 17 is connected with the coolant inlet end of the chiller 4; The outlet end of the coolant of chiller 4 is connected with the inlet end 4 #of the second five way valve 15; The outlet end 5 #of the second five way valve 15 is connected with the end 2 #of the third five way valve 16; 3 #end of the third five way valve 16 is connected with one end of the first water three-way pipe 53; One end of the first water tee 53 is connected with one end of the second water tee 54; One end of the third water three-way pipe 55 is connected with the inlet end of the first electronic water pump 10, and the blower 31 is arranged at one side of the vent of the evaporator 12.

Specifically, the first thermal management system C comprises a second electronic water pump 23, a battery pack 22 and a second water tee 54; Among them, The outlet end of the second electronic water pump 23 is connected with the inlet end of the battery pack 22; The outlet end of the battery pack 22 is connected with the inlet end 4 #of the first five way valve 17; One end of the second water tee 54 is connected with the second electronic water pump 23.

Specifically, the second thermal management system D includes a third electronic water pump 21, a low-temperature radiator 18, an electronic fan 32, a fourth water tee 56, a kettle 19, a motor and related components 20, and a fifth water tee 57; Among them, The outlet end of the third water pump 21 is connected with the inlet end 2 #of the first five way valve 17; 3 #at the outlet end of the first five way valve 17 is connected with 4 #at the inlet end of the third five way valve 16; The outlet end 5 #of the third five way valve 16 is connected with the inlet end of the low temperature radiator 18; The outlet end of the low temperature radiator 18 is connected with one end of the fourth water tee 56, and the outlet end of the low temperature radiator 18 is connected with one end of the kettle 19; The other end of the kettle 19 is connected with one end of the fifth water tee 57; 1 #at the outlet end of the third five way valve 16 is connected with one end of the fourth water three-way pipe 56; One end of the fourth water tee (56) is connected with the inlet end of the motor and related element (20); The outlet end of the motor and related components 20 is connected with one end of the fifth water tee 57; One end of the fifth water tee 57 and the inlet end of the third water pump 21; The electronic fan 32 is arranged on one side of the vent of the low-temperature radiator 18.

It can be understood that the refrigerant circulation system, the coolant circulation system, the first heat management system and the second heat management system set in the above embodiments can fully meet the needs of users on the premise of ensuring the heating, cooling, dehumidification and demisting functions and comfort of the vehicle air conditioning system. In addition, the system of the invention can freely switch the working mode of the air conditioning system to improve the performance It meets the requirements of various functions and comfort, energy saving, easy assembly, easy maintenance, good durability, high reliability and lightweight, etc. Its control method is intelligent, perfect and reasonable.

In another preferred embodiment based on the above embodiment, this embodiment provides a control method for an integrated heat pump air conditioning and heat management system with a five way valve. The control method is implemented by using the integrated heat pump air conditioning and heat management system with 3 five way valve in the above embodiment, including the following steps:

Several working modes are set according to user requirements, and the working state of the integrated heat pump air conditioning and thermal management system with five way valve is controlled according to the determined different working modes.

Specifically, when setting a number of working modes according to user requirements, obtain passenger compartment requirements, battery requirements and motor module requirements respectively, and set different working modes according to different passenger compartment requirements, battery requirements and motor module requirements obtained; Among them, the demand for motor module is the multi in one demand for motor, electronic control module, ACDC module and DCAC module.

Specifically, 0 represents no demand or ventilation, 2 represents heating, 3 represents cooling, and 4 represents heating and dehumidification in the passenger compartment demand;

In battery demand, 0 represents no demand, 1 represents even temperature, 2 represents heating, and 3 represents cooling;

Among the motor module requirements, 0 represents no requirement and 1 represents heat dissipation;

The working modes set according to different passenger compartment requirements, battery requirements and motor module requirements are respectively: 1 mode-17' mode.

Specifically, the 1 mode-17' mode set is:

mode 1: passenger compartment demand 0, battery demand 0, and electric motor module demand 1; (Not used the motor waste heat);

mode 1': passenger compartment demand 0, battery demand 0, and electric motor module demand 1; (Utilization of motor waste heat);

mode 2: passenger compartment demand 2, battery demand 0, and electric motor module demand 1; (heat pump);

mode 2': passenger compartment demand 2, battery demand 0, and electric motor module demand 1; (Water ceramic heater);

mode 3: passenger compartment demand 3, battery demand 0, and electric motor module demand 1;

mode 4: passenger compartment demand 4, battery demand 0, and electric motor module demand 1; (Same as mode 3);

mode 4': passenger compartment demand 4, battery demand 0, and electric motor module demand 1; (Parallel connection of electric drive for heater);

mode 5: passenger compartment demand 0, battery demand 1, and electric motor module demand 1; (Parallel connection of battery drives);

mode 5': passenger compartment demand 0, battery demand 1, and electric motor module demand 1; (Battery & electric drive in series);

mode 6: passenger compartment demand 2, battery demand 1, and electric motor module demand 1; (heat pump);

mode 6': passenger compartment demand 2, battery demand 1, and electric motor module demand 1; (Water ceramic heater);

mode 7: passenger compartment demand 3, battery demand 1, and electric motor module demand 1;

mode 8: passenger compartment demand 4, battery demand 1, and electric motor module demand 1; (Same as mode 7);

mode 8': passenger compartment demand 4, battery demand 1, and electric motor module demand 1; (Parallel connection of electric drive for heater);

mode 9: passenger compartment demand 0, battery demand 2, and electric motor module demand 1; (heat pump);

mode 9': passenger compartment demand 0, battery demand 2, and electric motor module demand 1; (Water ceramic heater);

mode 10: passenger compartment demand 2, battery demand 2, and electric motor module demand 1; (heat pump);

mode 10': passenger compartment demand 2, battery demand 2, and electric motor module demand 1; (Water ceramic heater);

mode 11: passenger compartment demand 3, battery demand 2, and electric motor module demand 1; (Parallel connection of battery & electric drive);

mode 11': passenger compartment demand 3, battery demand 2, and electric motor module demand 1; (Battery & electric drive in series);

mode 12: passenger compartment demand 4, battery demand 2, and electric motor module demand 1; (Same as mode 11);

mode 12': passenger compartment demand 4, battery demand 2, and electric motor module demand 1; (Same as mode 11');

mode 13: passenger compartment demand 0, battery demand 3, and electric motor module demand 1; (Fast charging mode);

mode 13': passenger compartment demand 0, battery demand 3, and electric motor module demand 1; (Same as mode 5');

mode 14: passenger compartment demand 2, battery demand 3, and electric motor module demand 1; (Passenger compartment heat pump);

mode 14': passenger compartment demand 2, battery demand 3, and electric motor module demand 1; (Water ceramic heater);

mode 15: passenger compartment demand 3, battery demand 3, and electric motor module demand 1;

mode 16: passenger compartment demand 4, battery demand 3, and electric motor module demand 1; (Same as mode 15);

mode 16': passenger compartment demand 4, battery demand 3, and electric motor module demand 1; (Passive battery cooling);

mode 17: passenger compartment demand 0, battery demand 0, and electric motor module demand 0; (Coolant filling mode 1);

mode 17': passenger compartment demand 0, battery demand 0, and electric motor module demand 0; (Coolant filling mode 2);

Specifically, according to the set mode 1-17' mode, the working state of the refrigerant circulation system, coolant circulation system, first thermal management system and second thermal management system in the integrated heat pump air conditioning and thermal management system with five-way valve is adjusted respectively.

Specifically, the motor module requirements described in this embodiment are the multi-in-one requirements of the motor, electronic control, ACDC, DCAC and other components.

Specifically, the user requirements in the above control method are shown in Table 1 below:

TABLE 1

Requirements or function lists for integrated heat pump Air conditioning and thermal management systems with five-way valves

| Passenger cabin requirements | Demand for batteries | Motor, Electric Control, ACDC and DCAC, and other multi-in-one requirements |
|---|---|---|
| 0- No demand or ventilation | 0-No demand | 0-No demand (Motor, Electric control, ACDC and DCAC are integrated, no water flow through) |
| 2-heating | 1 - mean temperature | 1-Heat dissipation |
| 3-cooling | 2- heating | |
| 4-defrost & demist | 3-cooling | |

Figure 2:
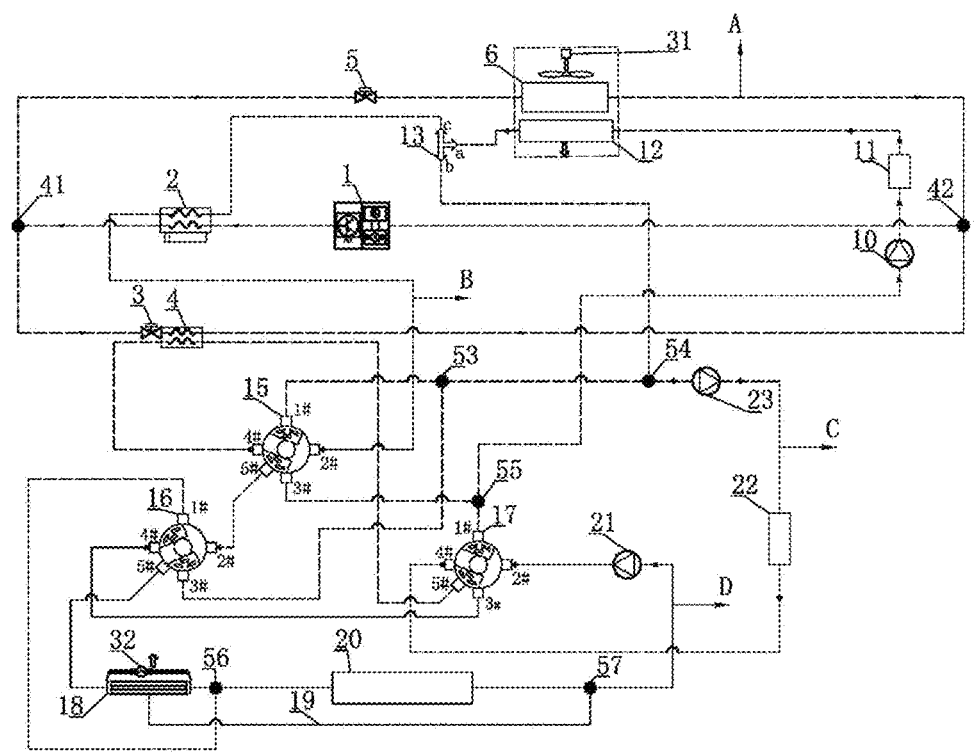
FIG. 2 is a schematic diagram of Mode 1 provided by embodiments of the invention.

Specifically, as shown in FIG. 2, in mode 1 (passenger cabin demand 0/battery demand 0/motor module demand 1) (no motor waste heat is utilized):

The states of five-way water valve, three-way water valve, electronic expansion valve, expansion valve with solenoid valve are shown in Table 2:

TABLE 2

| Part name | state |
|---|---|
| The first five-way valve 17 | 2#-3# on; 4#-5# on |
| Second five-way valve 15 | / |
| Third five-way valve 16 | 2#-1# on; 4#-5# on |
| Three-way water valve 13 | a-b off; a-c on |
| First electronic expansion valve 3 | off |
| Expansion valve with stop valve 5 | off |

Specifically, the second thermal management system D works together with the coolant circulation system B, and the third electronic water pump 21, the first five way valve 17, the third five way valve 16, the low-temperature radiator 18, the kettle 19, the motor and related components 20 work together; The motor and related elements 20 transmit heat to the coolant, and the low-temperature radiator 18 works with the electronic fan 32 to dissipate the heat of the refrigerant into the air, thus realizing the function or purpose of cooling the motor and related elements 20.

Figure 3:
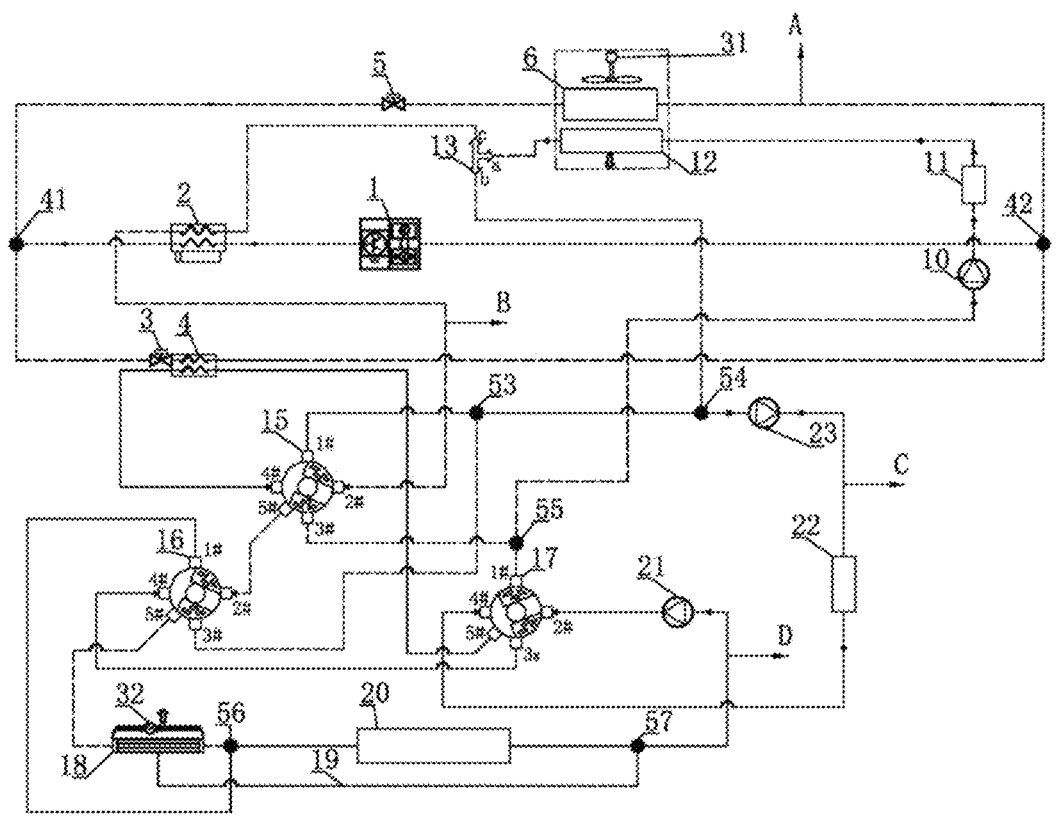
FIG. 3 is a schematic diagram of the 1' mode provided by the embodiment of the invention.

Specifically, as shown in FIG. 3, under 1' mode (passenger compartment demand 0, battery demand 0, motor module demand 1) (using motor waste heat):

The status of five way water valve, three way water valve, electronic expansion valve and expansion valve with solenoid valve is shown in Table 3:

TABLE 3

| Part name | state |
|---|---|
| The first five-way valve 17 | 2#-5# on; 4#-3# on |
| Second five-way valve 15 | 2#-5# on; 4#-1# on |
| Third five-way valve 16 | 2#-5# on; 4#-1# on |
| Three-way water valve 13 | a-b off; a-c on |
| First electronic expansion valve 3 | off |
| Expansion valve with stop valve 5 | off |

Specifically, the coolant circulation system B, the first thermal management system C, and the second thermal management system D work together, and the third electronic water pump 21, the first five way valve 17, the chiller 4, the second five way valve 15, the second electronic water pump 23, the battery pack 22, the third five way valve 16, the motor and related components 20 run together through the coolant pipe connection to form a coolant system, which takes away the heat from the motor and related components 20, It is stored and transferred to the battery to realize the function or purpose of cooling the motor and related components 20.

Figure 4:
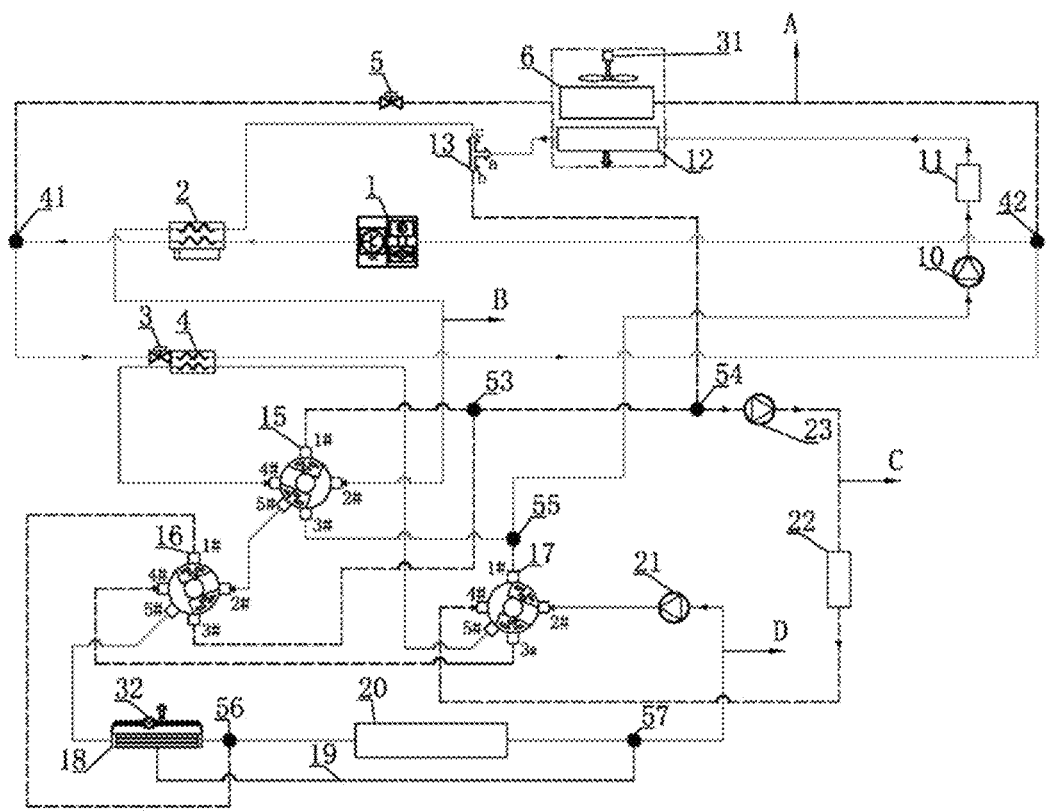
FIG. 4 is a schematic diagram of mode 2 provided by embodiments of the invention.

Specifically, as shown in FIG. 4, in mode 2 (passenger compartment demand 2, battery demand 0, motor module demand 1) (heat pump):

The status of five way water valve, three way water valve, electronic expansion valve and expansion valve with solenoid valve is shown in Table 4:

TABLE 4

| Part name | state |
| --- | --- |
| The first five-way valve 17 | 2#-5# on; 4#-1# on |
| Second five-way valve 15 | 2#-3# on; 4#-5# on |
| Third five-way valve 16 | 2#-5# on; 4#-3# on |
| Three-way water valve 13 | a-b off; a-c on |
| First electronic expansion valve 3 | on |
| Expansion valve with stop valve 5 | off |

Specifically, in the refrigerant circulation system A, the refrigerant system consisting of the electric compressor 1, the water-cooled condenser with the receiver & drier 2, the first electronic expansion valve 3, the chiller 4 and other major components is connected through the refrigerant pipe. The heat is transferred to the coolant side of the water-cooled condenser with the receiver & drier 2 through the refrigerant side of the water-cooled condenser with the receiver & drier 2; In the coolant circulating system B, the coolant system consisting of the first electronic water pump 10, the water ceramic heater 11, the heater 12, the three-way water valve 13, the water-cooled condenser with the receiver & drier 2, the second five way valve 15 and other main components is connected through the coolant pipe to operate, transferring the heat of the water-cooled condenser with the receiver & drier 2 to the heater 12; The heater 12 heats the air and then blows it out through the blower 31 to realize the heating function or purpose; In addition, the first thermal management system C and the second thermal management system D work together. The third electronic water pump 21, the first five way valve 17, the chiller 4, the second five way valve 15, the third five way valve 16, the low temperature radiator 18, the kettle 19, the motor and related components 20 are connected through the coolant pipe to form a coolant system, and heat is dissipated through the low temperature radiator 18 and the electronic fan 32, The cooled coolant can cool the motor and related components 20; To realize the function or purpose of cooling the motor and related components 20; At the same time, the circulation loop can take away the cooling quantity of chiller 4, thereby realizing the function of air conditioning and heat pump.

Figure 5:
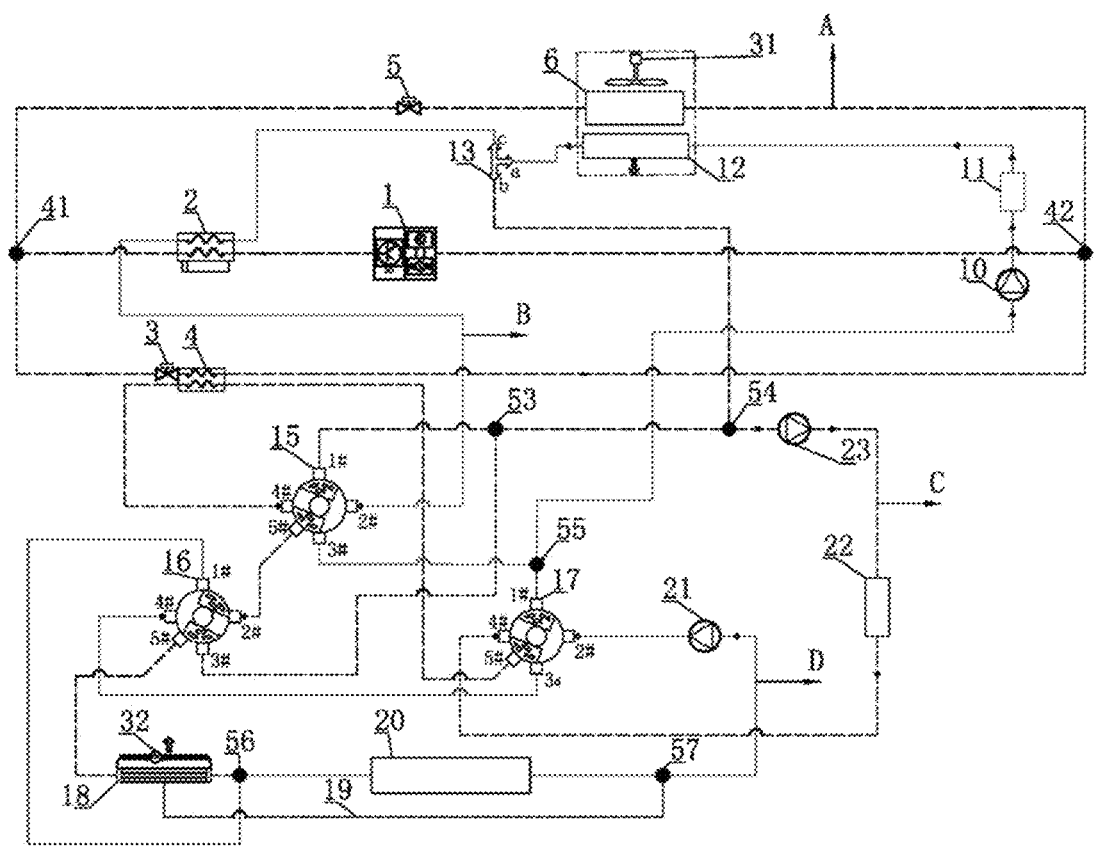
FIG. 5 is a schematic diagram of the 2' mode provided by the embodiment of the invention.

Specifically, as shown in FIG. 5, under 2' mode (passenger compartment demand 2, battery demand 0, motor module demand 1) (water ceramic heater):

The status of five way water valve, three way water valve, electronic expansion valve and expansion valve with solenoid valve is shown in Table 5:

TABLE 5

| Part name | state |
| --- | --- |
| The first five-way valve 17 | 2#-3# on; 4#-5# on |
| Second five-way valve 15 | 2#-3# on; 4#-5# on |
| Third five-way valve 16 | 2#-5# on; 4#-1# on |
| Three-way water valve 13 | a-b off; a-c on |
| First electronic expansion valve 3 | off |
| Expansion valve with stop valve 5 | off |

Specifically, in the coolant circulating system B, the coolant system consisting of the first electronic water pump 10, the water ceramic heater 11, the heater 12, the three-way water valve 13, the water-cooled condenser with the receiver & drier 2, the second five way valve 15 and other major components is connected through the coolant pipe to operate. The water ceramic heater 11 consumes electric energy and transfers heat to the heater 12; The heater 12 heats the air and then blows it out through the blower 31 to realize the heating function or purpose; In addition, the second thermal management system D works jointly, and the coolant system consisting of the third electronic water pump 21, the first five way valve 17, the third five way valve 16, the kettle 19, the motor and the main components of the related element 20 are connected through the coolant pipe. The heat of the motor and the related element 20 is taken away by the coolant.

Figure 6:
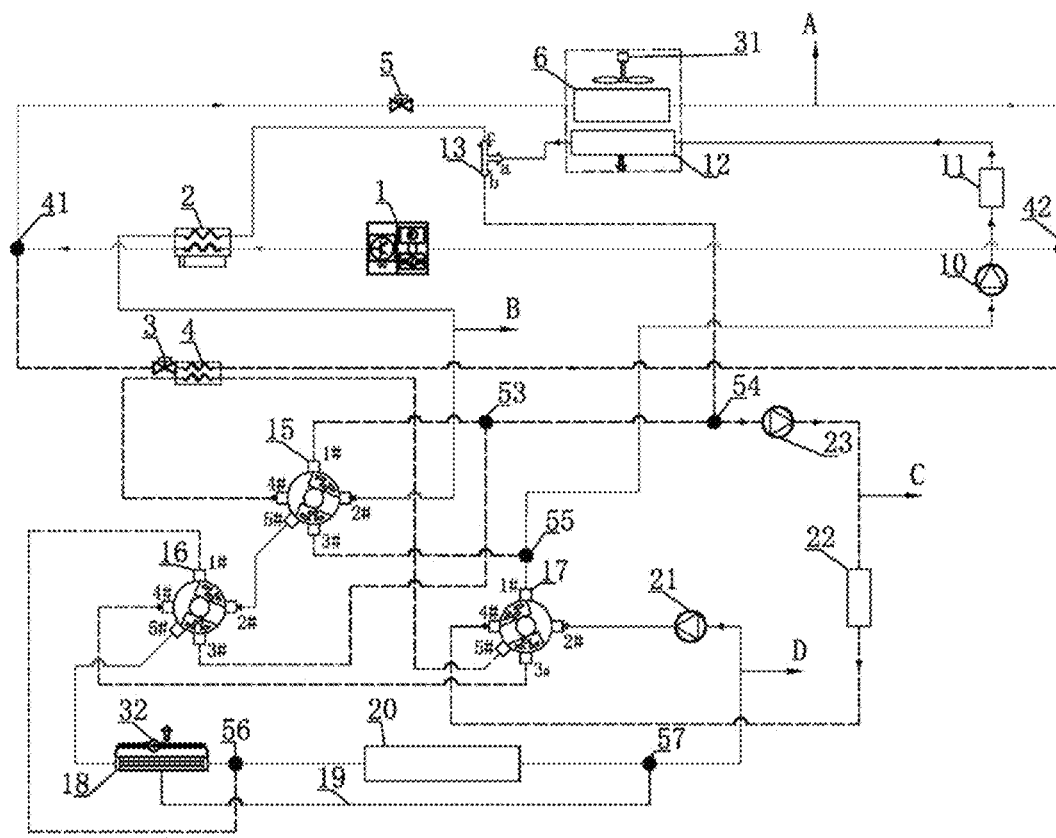
FIG. 6 is a schematic diagram of the three modes provided by embodiments of the invention.
Figure 7:
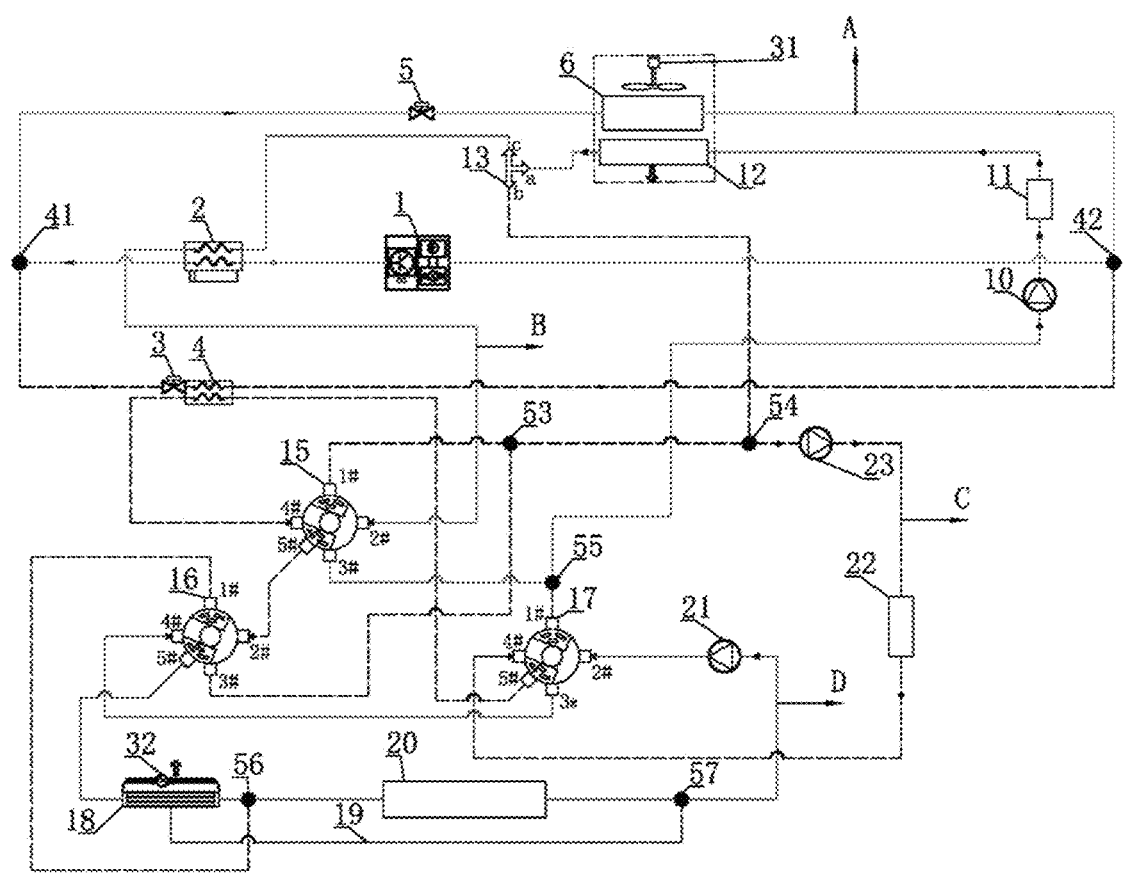
FIG. 7 is a schematic diagram of the 4' mode provided by the embodiment of the invention.

Specifically, as shown in FIG. 6, under the 3 mode (passenger compartment demand 3, battery demand 0, motor module demand 1), the five way water valve, three-way water valve, electronic expansion valve, and expansion valve with solenoid valve status are shown in Table 6:

TABLE 6

| Part name | state |
| --- | --- |
| The first five-way valve 17 | 2#-1# on; 4#-5# on |
| Second five-way valve 15 | 2#-5# on; 4#-1# on |
| Third five-way valve 16 | 2#-5# on; 4#-1# on |
| Three-way water valve 13 | a-b off; a-c on |
| First electronic expansion valve 3 | off |
| Expansion valve with stop valve 5 | on |

Specifically, in refrigerant circulation system A, the refrigerant system consisting of electric compressor 1, water-cooled condenser with receiver & drier 2, expansion valve with solenoid valve 5, evaporator 6 and other main components connected through refrigerant pipes operates, dehumidifies and cools the air through evaporator 6; The coolant circulating system B works jointly with the second thermal management system D. The coolant system consists of the first electronic water pump 10, the water ceramic heater 11, the heater 12, the three-way water valve 13, the water-cooled condenser with the receiver & drier 2, the second five way valve 15, the third five way valve 16, the low-temperature radiator 18, the kettle 19, the motor and related components 20, the third electronic water pump 21, and the first five way valve 17, which are connected through the coolant pipe, The heat of the water-cooled condenser with the receiver & drier 2 is transferred to the low-temperature radiator 18 and dissipated through the low-temperature radiator 18 and the electronic fan 32. In addition, the cooled coolant can cool the motor and related components 20 to realize the function or purpose of cooling the motor and related components 20.

Specifically, mode 4 (passenger compartment demand 4, battery demand 0, motor module demand 1) is the same as mode 3.

Specifically, under the 4' mode (passenger compartment demand 4, battery demand 0, motor module demand 1) (parallel connection of electric drive for heater), The status of five way water valve, three way water valve, electronic expansion valve and expansion valve with solenoid valve is shown in Table 7:

TABLE 7

| Part name | state |
| --- | --- |
| The first five-way valve 17 | 2#-3# on; 4#-5# on |
| Second five-way valve 15 | 2#-3# on; 4#-5# on |
| Third five-way valve 16 | 2#-3# on; 4#-5# on |
| Three-way water valve 13 | a-b off; a-c on |
| First electronic expansion valve 3 | off |
| Expansion valve with stop valve 5 | on |

Specifically, in refrigerant circulation system A, the refrigerant system consisting of electric compressor 1, water-cooled condenser with receiver & drier 2, expansion valve with solenoid valve 5, evaporator 6 and other main components connected through refrigerant pipes operates, dehumidifies and cools the air through evaporator 6; In the coolant circulating system B, the coolant system consisting of the first electronic water pump 10, the water ceramic heater 11, the heater 12, the three-way water valve 13, the water-cooled condenser with the receiver & drier 2, the second five way valve 15 and other main components is connected through the coolant pipe to operate, transferring the heat of the water-cooled condenser with the receiver & drier 2 to the heater 12; The heater 12 heats the air and then blows it out through the blower 31 to realize the heating function or purpose; In addition, the second thermal management system D works jointly. The coolant system consisting of the third electronic water pump 21, the first five way valve 17, the third five way valve 16, the low-temperature radiator 18, the kettle 19, the motor and the related components 20 are connected through the coolant pipe, and heat is dissipated through the low-temperature radiator 18 and the electronic fan 32. The cooled coolant can cool the motor and related components 20; So as to realize the function or purpose of radiating heat to the motor and related elements 20.

Figure 8:
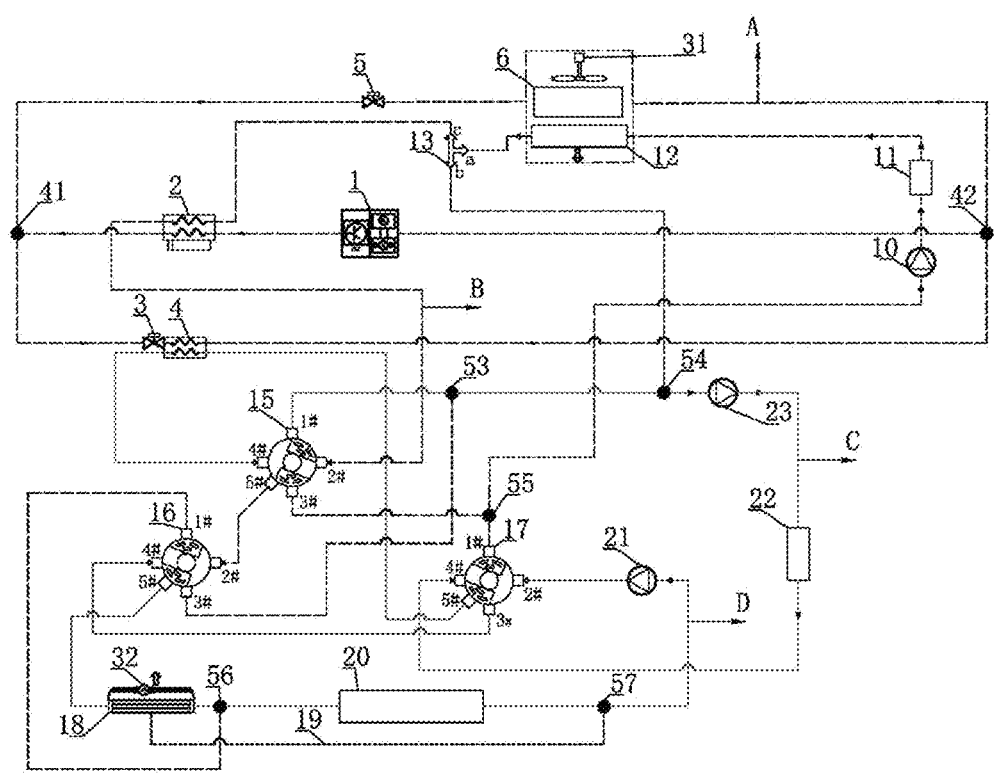
FIG. 8 is a schematic diagram of the 5 modes provided by embodiments of the invention.

Specifically, as shown in FIG. 8, under 5 modes (passenger compartment demand 0, battery demand 1, motor module demand 1) (battery electric & electric drive in parallel):

The status of five way water valve, three way water valve, electronic expansion valve and expansion valve with solenoid valve is shown in Table 8:

TABLE 8

| Part name | state |
| --- | --- |
| The first five-way valve 17 | 2#-3# on; 4#-5# on |
| Second five-way valve 15 | 2#-5# on; 4#-1# on |
| Third five-way valve 16 | 2#-3# on; 4#-5# on |
| Three-way water valve 13 | a-b off; a-c on |
| First electronic expansion valve 3 | off |
| Expansion valve with stop valve 5 | off |

Specifically, the second thermal management system D works together with the coolant circulation system B, and the third electronic water pump 21, the first five way valve 17, the third five way valve 16, the low-temperature radiator 18, the kettle 19, the motor and related components 20 work together; The motor and related elements 20 transmit heat to the coolant, and the low-temperature radiator 18 works with the electronic fan 32 to dissipate the heat of the coolant into the air, thus realizing the function or purpose of cooling the motor and related elements 20. In addition, the first thermal management system C and the coolant circulation system B work together, and the coolant system composed of the second electronic water pump 23, battery pack 22, first five way valve 17, chiller 4, and second five way valve 15 is connected through the coolant pipe to operate, so as to achieve the function or purpose of even temperature of the battery pack.

Figure 9:
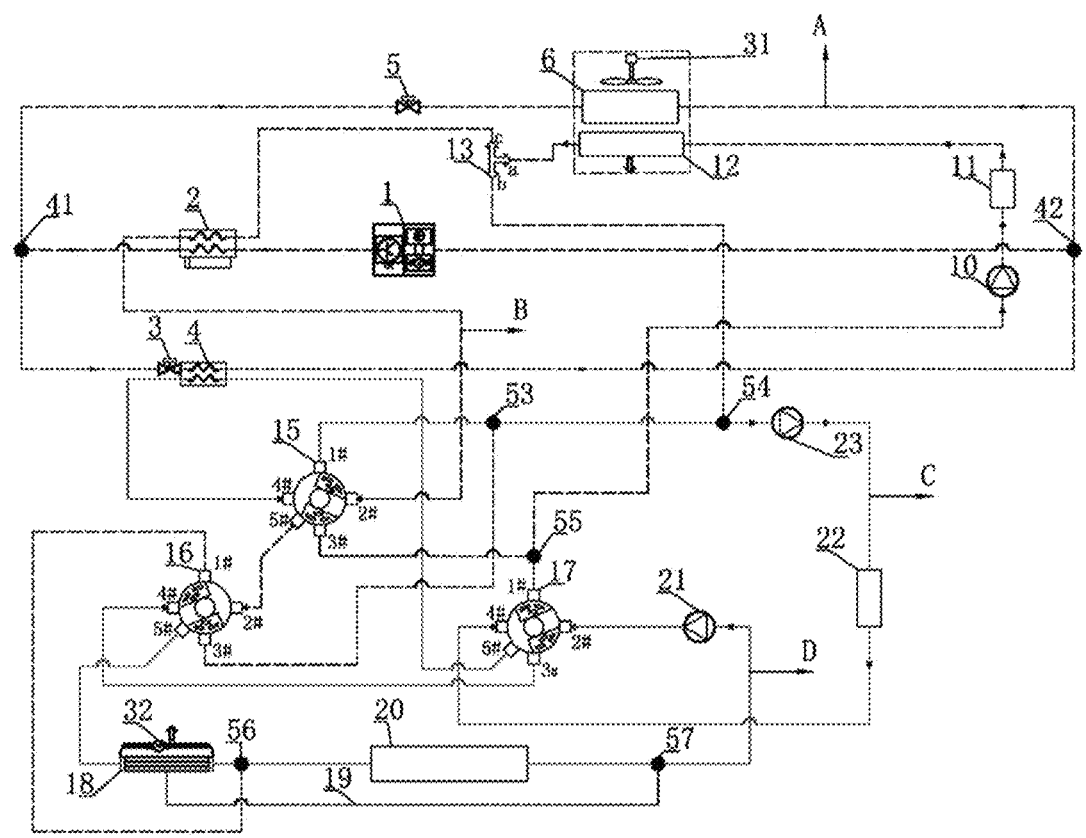
FIG. 9 is a schematic diagram of the 5' mode provided by the embodiment of the invention.

Specifically, as shown in FIG. 9, under 5' mode (passenger compartment demand 0, battery demand 1, motor module demand 1) (battery electric & electric drive in series):

The status of five way water valve, three way water valve, electronic expansion valve and expansion valve with solenoid valve is shown in Table 9:

TABLE 9

| Part name | state |
| --- | --- |
| The first five-way valve 17 | 2#-5# on; 4#-3# on |
| Second five-way valve 15 | 2#-5# on; 4#-1# on |
| Third five-way valve 16 | 2#-1# on; 4#-5# on |
| Three-way water valve 13 | a-b off; a-c on |
| First electronic expansion valve 3 | off |
| Expansion valve with stop valve 5 | off |

Specifically, the coolant circulating system B, the first thermal management system C, and the second thermal management system D work together. The coolant system consists of the third electronic water pump 21, the first five way valve 17, the chiller 4, the second five way valve 15, the second electronic water pump 23, the battery pack 22, the third five way valve 16, the low-temperature radiator 18, the kettle 19, the motor, and related components 20, which are connected through the coolant pipe and run through the low-temperature radiator 18 The electronic fan 32 dissipate heat, and the cooled coolant can cool the motor and related components 20; To realize the function or purpose of cooling the motor and related components and equalizing the temperature of the battery pack.

Figure 10:
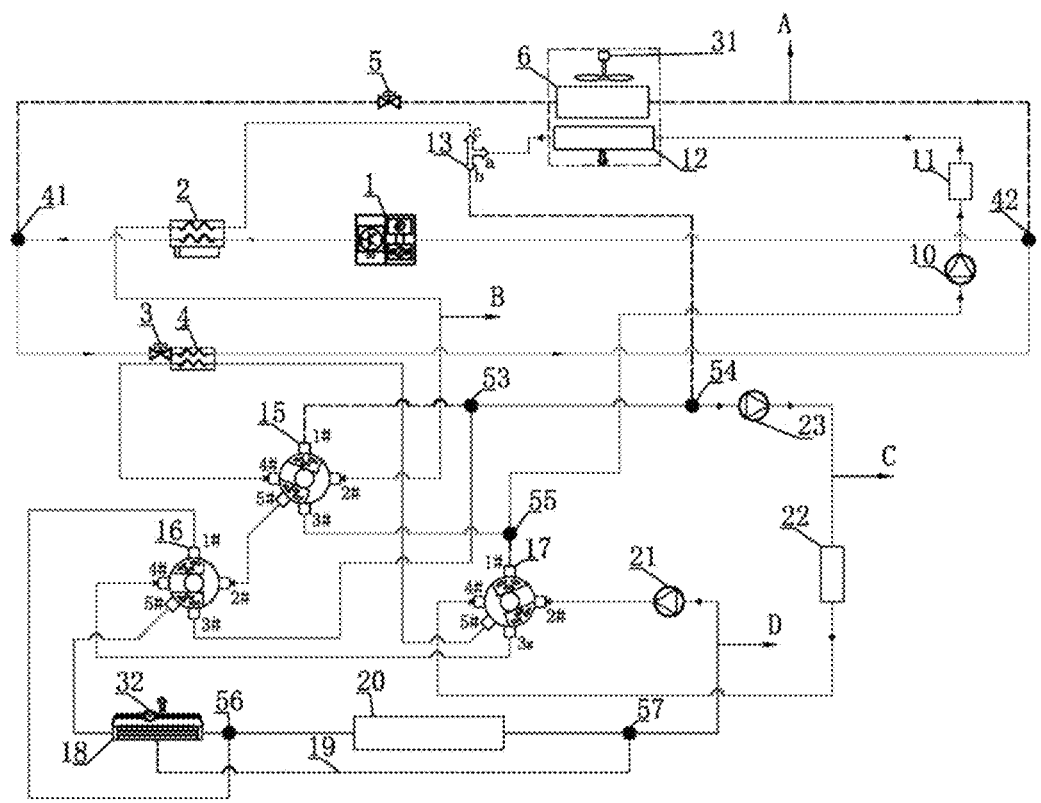
FIG. 10 is a schematic diagram of the six modes provided by embodiments of the invention.

Specifically, as shown in FIG. 10, in mode 6 (passenger compartment demand 2, battery demand 1, motor module demand 1) (heat pump):

The status of five way water valve, three way water valve, electronic expansion valve and expansion valve with solenoid valve is shown in Table 10:

TABLE 10

| Part name | state |
| --- | --- |
| The first five-way valve 17 | 2#-5# on; 4#-3# on |
| Second five-way valve 15 | 2#-3# on; 4#-5# on |
| Third five-way valve 16 | 2#-1, 3# on; 4#-5# on |
| Three-way water valve 13 | a-b off; a-c on |
| First electronic expansion valve 3 | on |
| Expansion valve with stop valve 5 | off |

Specifically, in the refrigerant circulation system A, the refrigerant system consisting of the electric compressor 1, the water-cooled condenser with the receiver & drier 2, the first electronic expansion valve 3, the chiller 4 and other major components is connected through the refrigerant pipe. The heat is transferred to the coolant side of the water-cooled condenser with the receiver & drier 2 through the refrigerant side of the water-cooled condenser with the receiver & drier 2; In the coolant circulating system B, the coolant system consisting of the first electronic water pump 10, the water ceramic heater 11, the heater 12, the three-way water valve 13, the water-cooled condenser with the receiver & drier 2, the second five way valve 15 and other main components is connected through the coolant pipe to operate, transferring the heat of the water-cooled condenser with the receiver & drier 2 to the heater 12; The heater 12 heats the air and then blows it out through the blower 31 to realize the heating function or purpose; In addition, the first thermal management system C and the second thermal management system D work together, and the coolant system consisting of the third electronic water pump 21, the first five way valve 17, the chiller 4, the second five way valve 15, the second electronic water pump 23, the battery pack 22, the third five way valve 16, the low-temperature radiator 18, the kettle 19, the motor and the main components of the related components 20 are connected through the coolant pipe runs; In the water circuit, the cooling quantity of chiller 4 is taken away, and the heat of motor and related components 20 is absorbed; The electronic fan 32 may or may not work, depending on the situation; If the water temperature is high, heat will be dissipated through low temperature radiator 18 and electronic fan 32; In this way, the function or purpose of radiating heat rejection to the motor and related components 20 is realized; At the same time, the circulation loop can take away the cooling quantity of chiller 4, thereby realizing the function of air conditioning and heat pump.

Figure 11:
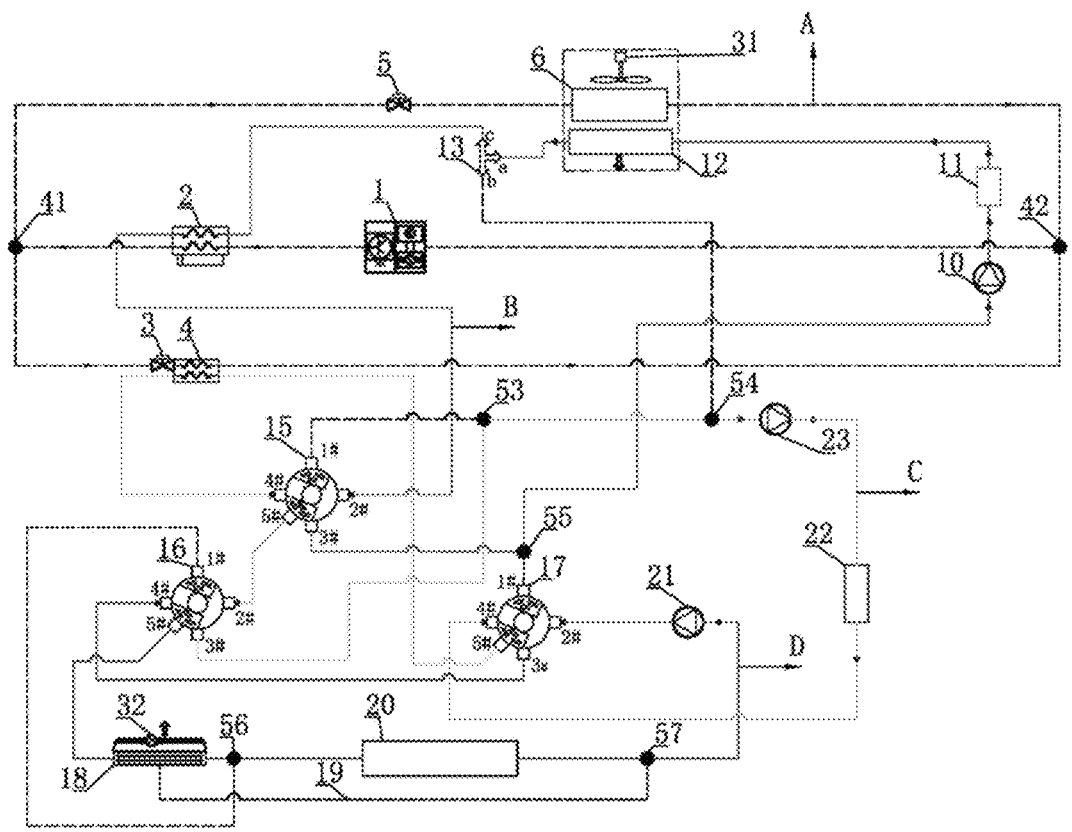
FIG. 11 is a schematic diagram of the 6' mode provided by the embodiment of the invention.

Specifically, as shown in FIG. 11, under 6' mode (passenger compartment demand 2, battery demand 1, motor module demand 1) (water ceramic heater):

The status of five way water valve, three way water valve, electronic expansion valve and expansion valve with solenoid valve is shown in Table 11:

TABLE 11

| Part name | state |
|---|---|
| The first five-way valve 17 | 2#-3# on; 4#-5# on |
| Second five-way valve 15 | 2#-3# on; 4#-5# on |
| Third five-way valve 16 | 2#-3# on; 4#-5# on |
| Three-way water valve 13 | a-b off; a-c on |
| First electronic expansion valve 3 | off |
| Expansion valve with stop valve 5 | off |

Specifically, in the coolant circulating system B, the coolant system consisting of the first electronic water pump 10, the water ceramic heater 11, the heater 12, the three-way water valve 13, the water-cooled condenser with the receiver & drier 2, the second five way valve 15 and other major components is connected through the coolant pipe to operate. The water ceramic heater 11 consumes electric energy and transfers heat to the heater 12; The heater 12 heats the air and then blows it out through the blower 31 to realize the heating function or purpose; At the same time, the first thermal management system C works jointly, and the coolant system composed of the second electronic water pump 23, battery pack 22, first five way valve 17, chiller 4, and second five way valve 15, the third five way valve 16, is connected through the coolant pipe to operate, so as to achieve the function or purpose of equalizing the temperature of the battery pack.

In addition, the second thermal management system D works jointly. The coolant system consisting of the third electronic water pump 21, the first five way valve 17, the third five way valve 16, the low-temperature radiator 18, the kettle 19, the motor and the related components 20 are connected through the coolant pipe, and heat is dissipated through the low-temperature radiator 18 and the electronic fan 32. The cooled coolant can cool the motor and related components 20; So as to realize the function or purpose of radiating heat to the motor and related elements 20.

Figure 12:
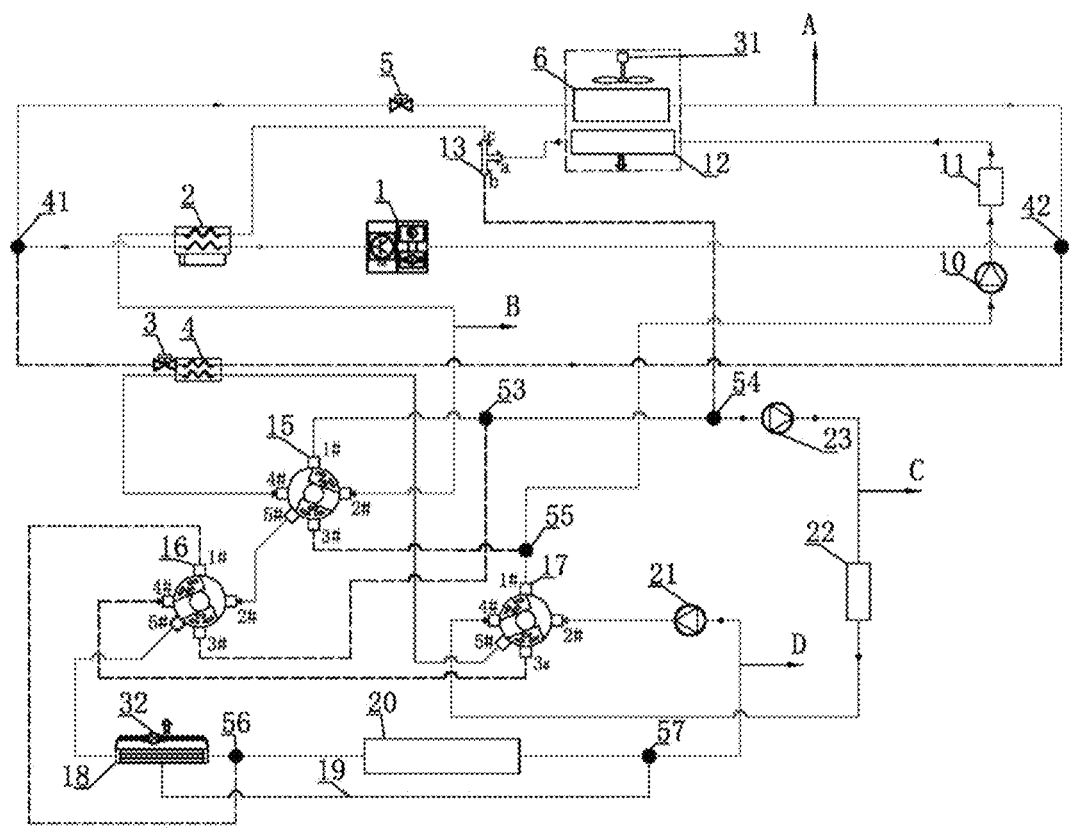
FIG. 12 is a schematic diagram of 7 modes provided by embodiments of the invention.

Specifically, as shown in FIG. 12, under mode 7 (passenger compartment demand 3, battery demand 1, motor module demand 1), The status of five way water valve, three way water valve, electronic expansion valve and expansion valve with solenoid valve is shown in Table 12:

TABLE 12

| Part name | state |
|---|---|
| The first five-way valve 17 | 2#-1# on; 4#-5# on |
| Second five-way valve 15 | 2#-5# on; 4#-1# on |
| Third five-way valve 16 | 2#-5# on; 4#-1# on |
| Three-way water valve 13 | a-b off; a-c on |
| First electronic expansion valve 3 | off |
| Expansion valve with stop valve 5 | on |

Specifically, in refrigerant circulation system A, the refrigerant system consisting of electric compressor 1, water-cooled condenser with receiver & drier 2, expansion valve with solenoid valve 5, evaporator 6 and other main components connected through refrigerant pipes operates, dehumidifies and cools the air through evaporator 6; The coolant circulating system B works jointly with the second thermal management system D. The coolant system consists of the first electronic water pump 10, the water ceramic heater 11, the heater 12, the three-way water valve 13, the water-cooled condenser with the receiver & drier 2, the second five way valve 15, the third five way valve 16, the low-temperature radiator 18, the kettle 19, the motor and related components 20, the third electronic water pump 21, and the first five way valve 17, which are connected through the coolant pipe, Transfer the heat of the water-cooled condenser with receiver & drier 2 to the low-temperature radiator 18, and dissipate heat through the low-temperature radiator 18 and the electronic fan 32; At the same time, the cooled coolant can cool the motor and related elements 20 to realize the function or purpose of cooling the motor and related elements 20. In addition, the first thermal management system C works jointly, and the coolant system composed of the second electronic water pump 23, battery pack 22, first five way valve 17, chiller 4, and second five way valve 15 is connected through the coolant pipe to operate, so as to achieve the function or purpose of equalizing the temperature of the battery pack.

Specifically, mode 8 (passenger compartment demand 4, battery demand 1, motor module demand 1) is the same as mode 7.

Figure 13:
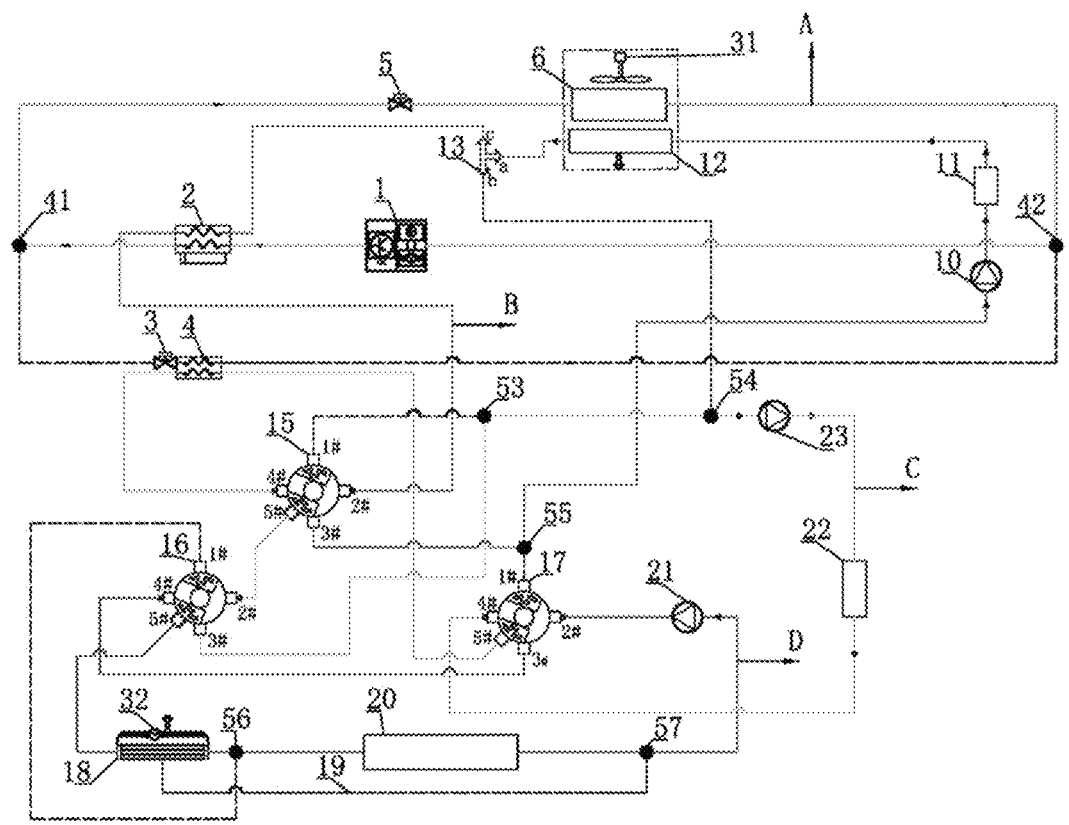
FIG. 13 is a schematic diagram of the 8' mode provided by the embodiment of the invention.

Specifically, as shown in FIG. 13, under the 8' mode (passenger compartment demand 4, battery demand 1, motor module demand 1) (parallel connection of electric drives for heater), The status of five way water valve, three way water valve, electronic expansion valve and expansion valve with solenoid valve is shown in Table 13:

TABLE 13

| Part name | state |
|---|---|
| The first five-way valve 17 | 2#-3# on; 4#-5# on |
| Second five-way valve 15 | 2#-3# on; 4#-5# on |
| Third five-way valve 16 | 2#-3# on; 4#-5# on |

TABLE 13-continued

| Part name | state |
| --- | --- |
| Three-way water valve 13 | a-b off; a-c on |
| First electronic expansion valve 3 | off |
| Expansion valve with stop valve 5 | on |

Specifically, in refrigerant circulation system A, the refrigerant system consisting of electric compressor 1, water-cooled condenser with receiver & drier 2, expansion valve with solenoid valve 5, evaporator 6 and other main components connected through refrigerant pipes operates, dehumidifies and cools the air through evaporator 6; In the coolant circulating system B, the coolant system consisting of the first electronic water pump 10, the water ceramic heater 11, the heater 12, the three-way water valve 13, the water-cooled condenser with receiver & drier 2, the second five way valve 15 and other main components is connected through the coolant pipe to operate, transferring the heat of the water-cooled condenser with receiver & drier 2 to the heater 12; The heater 12 heats the cooled air from evaporator and then blows it out through the blower 31 to realize the heating function or purpose; At the same time, the first thermal management system C works jointly, and the coolant system composed of the second electronic water pump 23, battery pack 22, first five way valve 17, chiller 4, second five way valve 15, and third five way valve 16 is connected through the coolant pipe to operate, so as to achieve the function or purpose of equalizing the temperature of the battery pack. In addition, the second thermal management system D works jointly. The coolant system consisting of the third electronic water pump 21, the first five way valve 17, the third five way valve 16, the low-temperature radiator 18, the kettle 19, the motor and the related components 20 are connected through the coolant pipe, and heat is dissipated through the low-temperature radiator 18 and the electronic fan 32. The cooled coolant can cool the motor and related components 20; So as to realize the function or purpose of radiating heat to the motor and related elements 20.

Figure 14:
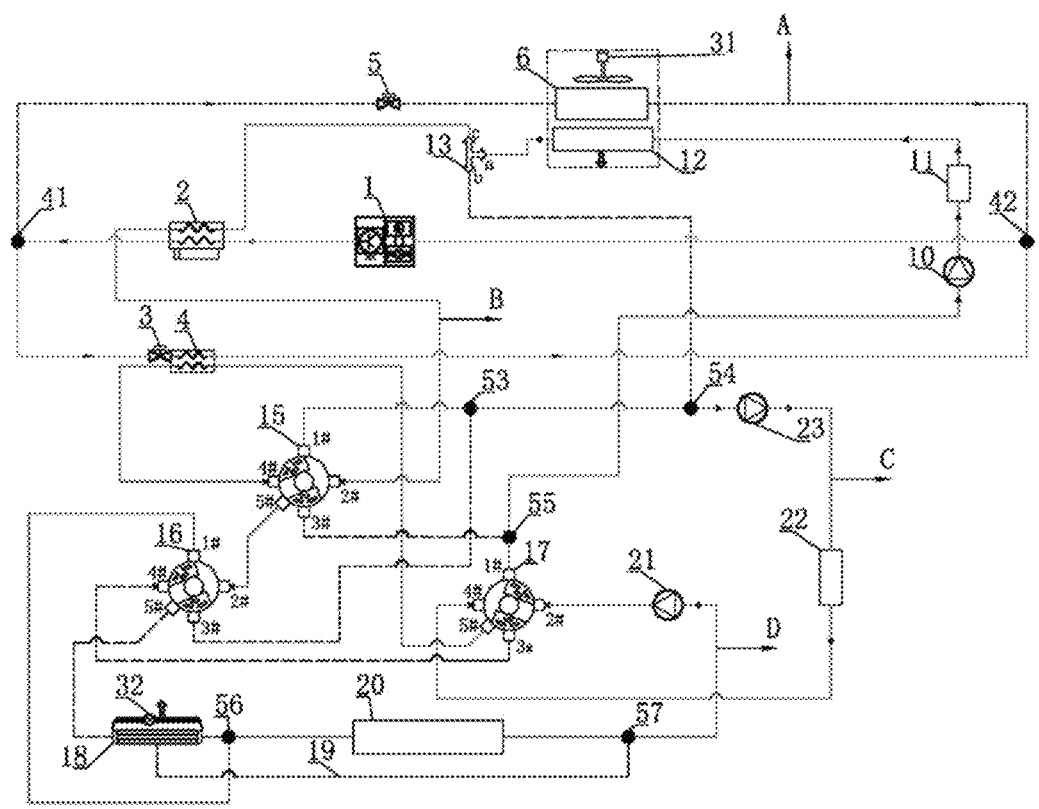
FIG. 14 is a schematic diagram of 9 modes provided by embodiments of the invention.

Specifically, as shown in FIG. 14, in mode 9 (passenger compartment demand 0, battery demand 2, motor module demand 1) (heat pump):

The status of five way water valve, three way water valve, electronic expansion valve and expansion valve with solenoid valve is shown in Table 14:

TABLE 14

| Part name | state |
| --- | --- |
| The first five-way valve 17 | 2#-5# on; 4#-1# on |
| Second five-way valve 15 | 2#-1# on; 4#-5# on |
| Third five-way valve 16 | 2#-1# on; 4#-5# on |
| Three-way water valve 13 | a-b off; a-c on |
| First electronic expansion valve 3 | on |
| Expansion valve with stop valve 5 | off |

Specifically, in the refrigerant circulation system A, the refrigerant system consisting of the electric compressor 1, the water-cooled condenser with receiver & drier 2, the first electronic expansion valve 3, the chiller 4 and other major components is connected through the refrigerant pipe. The heat is transferred to the coolant side of the water-cooled condenser with receiver & drier 2 through the refrigerant side of the water-cooled condenser with receiver & drier 2; The coolant circulating system B works jointly with the first thermal management system C. The coolant system consists of the first electronic water pump 10, the water ceramic heater 11, the heater 12, the three-way water valve 13, the water-cooled condenser with receiver & drier 2, the second five way valve 15, the second electronic water pump 23, the battery pack 22, the first five way valve 17 and other major components connected through the coolant pipe runs, and transfers the heat of the water-cooled condenser with receiver & drier 2 to the battery pack 22; To realize the function or purpose of heating the battery; In addition, the second thermal management system D works jointly, and the coolant system consisting of the third electronic water pump 21, the first five way valve 17, the chiller 4, the second five way valve 15, the third five way valve 16, the motor and the main components of the related components 20 are connected through the coolant pipe runs; The cooling quantity of chiller 4 is taken away by the motor or the external temperature. If the water temperature is high, the mode can be switched, and heat is dissipated through the low temperature radiator 18 and the electronic fan 32.

Figure 15:
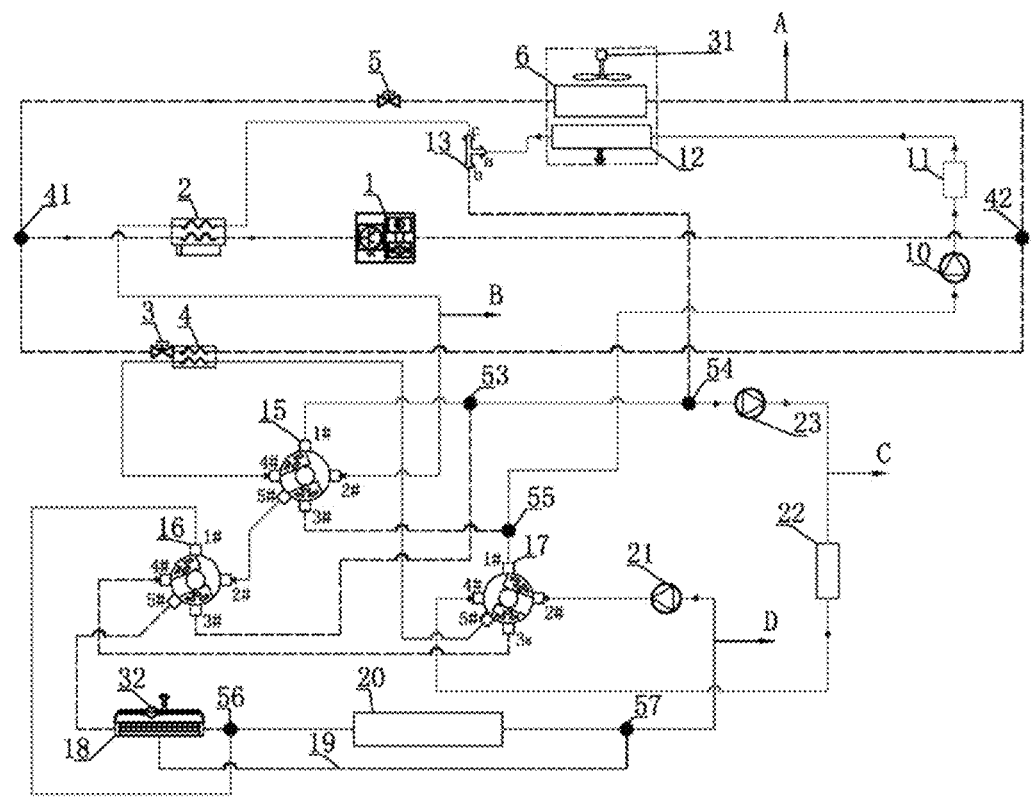
FIG. 15 is a schematic diagram of the 9' mode provided by the embodiment of the invention.

Specifically, as shown in FIG. 15, in 9' mode (passenger compartment demand 0, battery demand 2, motor module demand 1) (water ceramic heater):

The status of five way water valve, three way water valve, electronic expansion valve and expansion valve with solenoid valve is shown in Table 15:

TABLE 15

| Part name | state |
| --- | --- |
| The first five-way valve 17 | 2#-5# on; 4#-1# on |
| Second five-way valve 15 | 2#-1# on; 4#-5# on |
| Third five-way valve 16 | 2#-1# on; 4#-5# on |
| Three-way water valve 13 | a-b off; a-c on |
| First electronic expansion valve 3 | off |
| Expansion valve with stop valve 5 | off |

Specifically, the coolant circulating system B works jointly with the first thermal management system C. The coolant system consists of the first electronic water pump 10, the water ceramic heater 11, the heater 12, the three-way water valve 13, the water-cooled condenser with receiver & drier 2, the second five way valve 15, the second electronic water pump 23, the battery pack 22, the first five way valve 17 and other major components connected through the coolant pipe. The water ceramic heater 11 consumes electric energy, The heat is transferred to the battery pack 22 to heat the battery pack. In addition, the second thermal management system D works jointly, and the coolant system consisting of the third electronic water pump 21, the first five way valve 17, the chiller 4, the second five way valve 15, the third five way valve 16, the water kettle 19, the motor and the main components of the related components 20 are connected through the coolant pipe runs; At this time, the heat of the motor is used to heat the water temperature.

Figure 16:
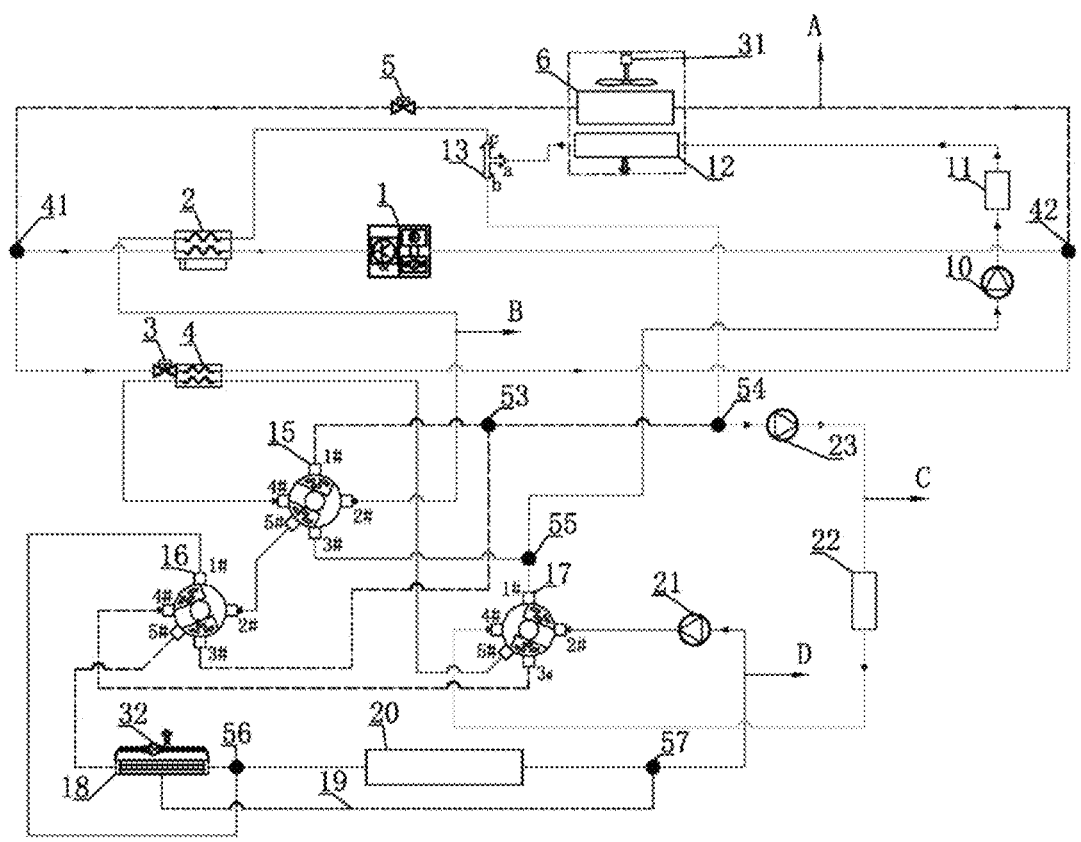
FIG. 16 is a schematic diagram of 10 modes provided by embodiments of the invention.

Specifically, as shown in FIG. 16, under 10 mode (passenger compartment demand 2, battery demand 2, motor module demand 1) (heat pump):

The status of five way water valve, three way water valve, electronic expansion valve and expansion valve with solenoid valve is shown in Table 16:

TABLE 16

| Part name | state |
| --- | --- |
| The first five-way valve 17 | 2#-5# on; 4#-1# on |
| Second five-way valve 15 | 2#-3# on; 4#-5# on |
| Third five-way valve 16 | 2#-1# on; 4#-5# on |

TABLE 16-continued

| Part name | state |
| --- | --- |
| Three-way water valve 13 | a-b on; a-c on |
| First electronic expansion valve 3 | on |
| Expansion valve with stop valve 5 | off |

Specifically, in the refrigerant circulation system A, the refrigerant system consisting of the electric compressor 1, the water-cooled condenser with receiver & drier 2, the first electronic expansion valve 3, the chiller 4 and other major components is connected through the refrigerant pipe. The heat is transferred to the coolant side of the water-cooled condenser with receiver & drier 2 through the refrigerant side of the water-cooled condenser with receiver & drier 2; The coolant circulating system B works jointly with the first thermal management system C. The coolant system consists of the first electronic water pump 10, the water ceramic heater 11, the heater 12, the three-way water valve 13, the water-cooled condenser with receiver & drier 2, the second five way valve 15, the second electronic water pump 23, the battery pack 22, the first five way valve 17 and other major components, which are connected through the coolant pipe to operate, transferring the heat of the water-cooled condenser with receiver & drier 2 to the heater 12; The heater 12 heats the air and then blows it out through the blower 31 to realize the heating function or purpose; At the same time, the coolant from the outlet of the heater 12 can also heat the battery pack 22; In addition, the second thermal management system D—works jointly, and the coolant system composed of the third electronic water pump 21, the first five way valve 17, the chiller 4, the second five way valve 15, the third five way valve 16, the water kettle 19, the motor and the main components of the related components 20 are connected through the coolant pipe to operate; In the water circuit, the cooling quantity of chiller 4 is taken away, and the heat of motor and related components 20 is absorbed; In this way, the function or purpose of radiating heat to the motor and related components 20 is realized; At the same time, the circulation loop can take away the cooling quantity of chiller 4, thereby realizing the function of air conditioning and heat pump.

Figure 17:
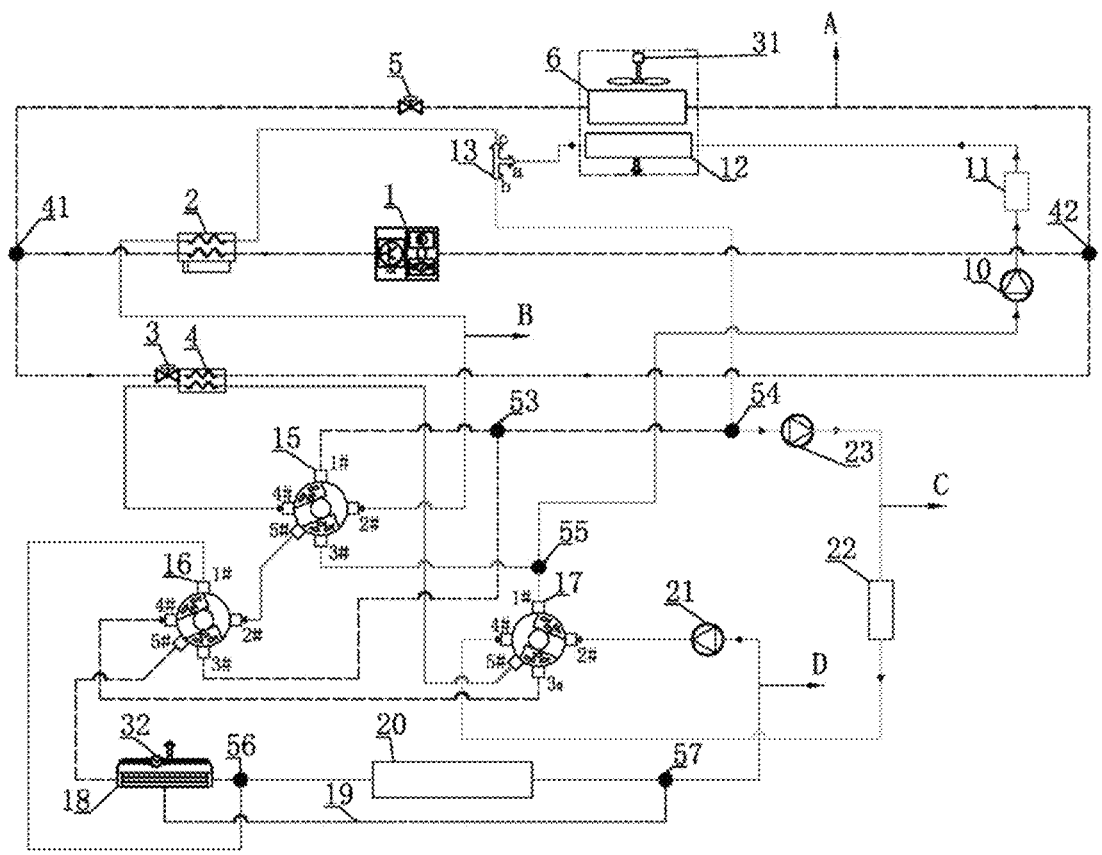
FIG. 17 is a schematic diagram of the 10' mode provided by the embodiment of the invention.

Specifically, as shown in FIG. 17, under 10' mode (passenger compartment demand 2, battery demand 2, motor module demand 1) (water ceramic heater):

The status of five way water valve, three way water valve, electronic expansion valve and expansion valve with solenoid valve is shown in Table 17:

TABLE 17

| Part name | state |
| --- | --- |
| The first five-way valve 17 | 2#-5# on; 4#-1# on |
| Second five-way valve 15 | 2#-3# on; 4#-5# on |
| Third five-way valve 16 | 2#-1# on; 4#-5# on |
| Three-way water valve 13 | a-b on; a-c on |
| First electronic expansion valve 3 | off |
| Expansion valve with stop valve 5 | off |

Specifically, the coolant circulating system B works jointly with the first thermal management system C. The coolant system consists of the first electronic water pump 10, the water ceramic heater 11, the heater 12, the three-way water valve 13, the water-cooled condenser with receiver & drier 2, the second five way valve 15, the second electronic water pump 23, the battery pack 22, the first five way valve 17 and other major components connected through the coolant pipe. The water ceramic heater 11 consumes electric energy, Transferring heat to the heater 12; The heater 12 heats the air and then blows it out through the blower 31 to realize the heating function or purpose; At the same time, the coolant from the outlet of the heater 12 can also heat the battery pack 22; In addition, the second thermal management system D works jointly, and the coolant system composed of the third electronic water pump 21, the first five way valve 17, the chiller 4, the second five way valve 15, the third five way valve 16, the water kettle 19, the motor and the main components of the related components 20 are connected through the coolant pipe to operate; At this time, the heating of the motor is used to heat the water temperature.

Figure 18:
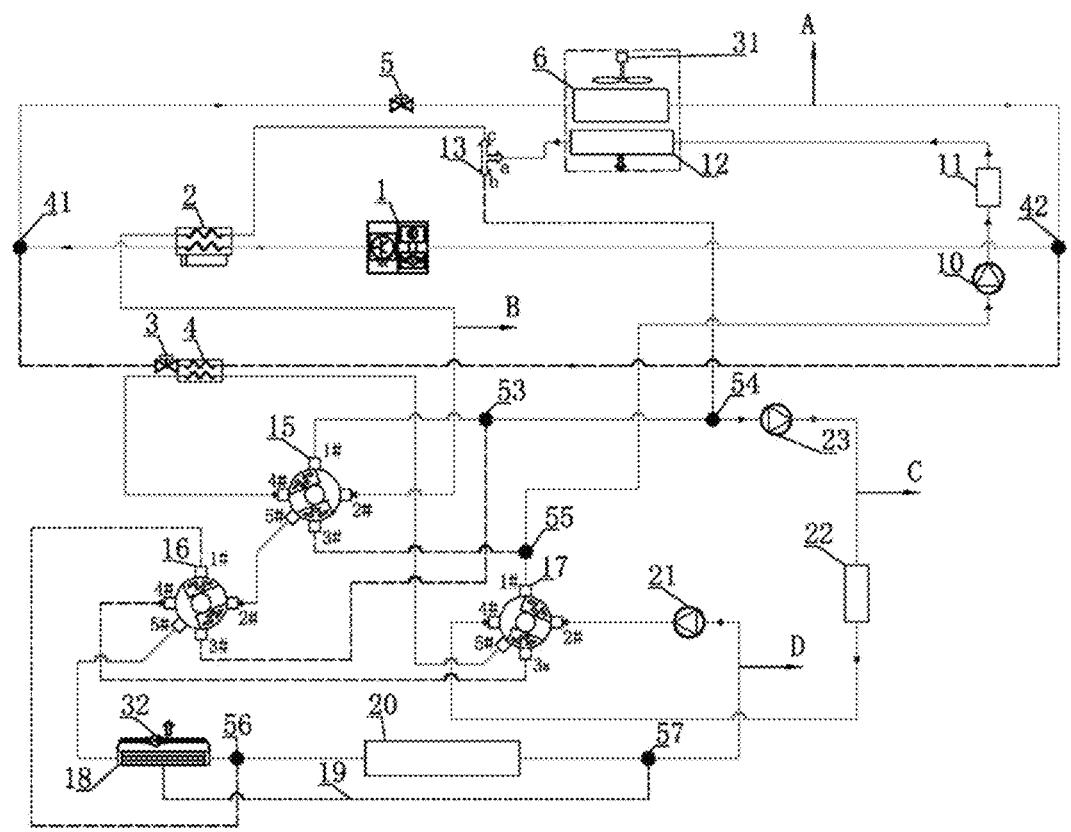
FIG. 18 is a schematic diagram of mode 11 provided by embodiments of the invention.

Specifically, as shown in FIG. 18, under the 11 mode (passenger compartment demand 3, battery demand 2, motor module demand 1) (battery electric & electric drive in parallel):

The status of five way water valve, three way water valve, electronic expansion valve and expansion valve with solenoid valve is shown in Table 18:

TABLE 18

| Part name | state |
| --- | --- |
| The first five-way valve 17 | 2#-5# on; 4#-1# on |
| Second five-way valve 15 | 2#-1# on; 4#-5# on |
| Third five-way valve 16 | 2#-5# on; 4#-3# on |
| Three-way water valve 13 | a-b off; a-c on |
| First electronic expansion valve 3 | off |
| Expansion valve with stop valve 5 | on |

Specifically, in refrigerant circulation system A, the refrigerant system consisting of electric compressor 1, water-cooled condenser with receiver & drier 2, expansion valve with solenoid valve 5, evaporator 6 and other main components connected through refrigerant pipes operates, dehumidifies and cools the air through evaporator 6; The coolant circulating system B works jointly with the first thermal management system C. The coolant system consists of the first electronic water pump 10, the water ceramic heater 11, the heater 12, the three-way water valve 13, the water-cooled condenser with receiver & drier 2, the second five way valve 15, the second electronic water pump 23, the battery pack 22, the first five way valve 17 and other major components connected through the coolant pipe runs. The heat of the water-cooled condenser with receiver & drier 2 is used to heat the battery pack; In addition, the first thermal management system C the second thermal management system D works jointly, and the coolant system composed of the third electronic water pump 21, the first five way valve 17, the chiller 4, the second five way valve 15, the third five way valve 16, the low-temperature radiator 18, the water kettle 19, the motor and the main components of the related components 20 are connected through the coolant pipe to operate; And dissipate heat through the low-temperature radiator 18 and the electronic fan 32; In this way, the function or purpose of cooling the motor and related components 20 is realized.

Figure 19:
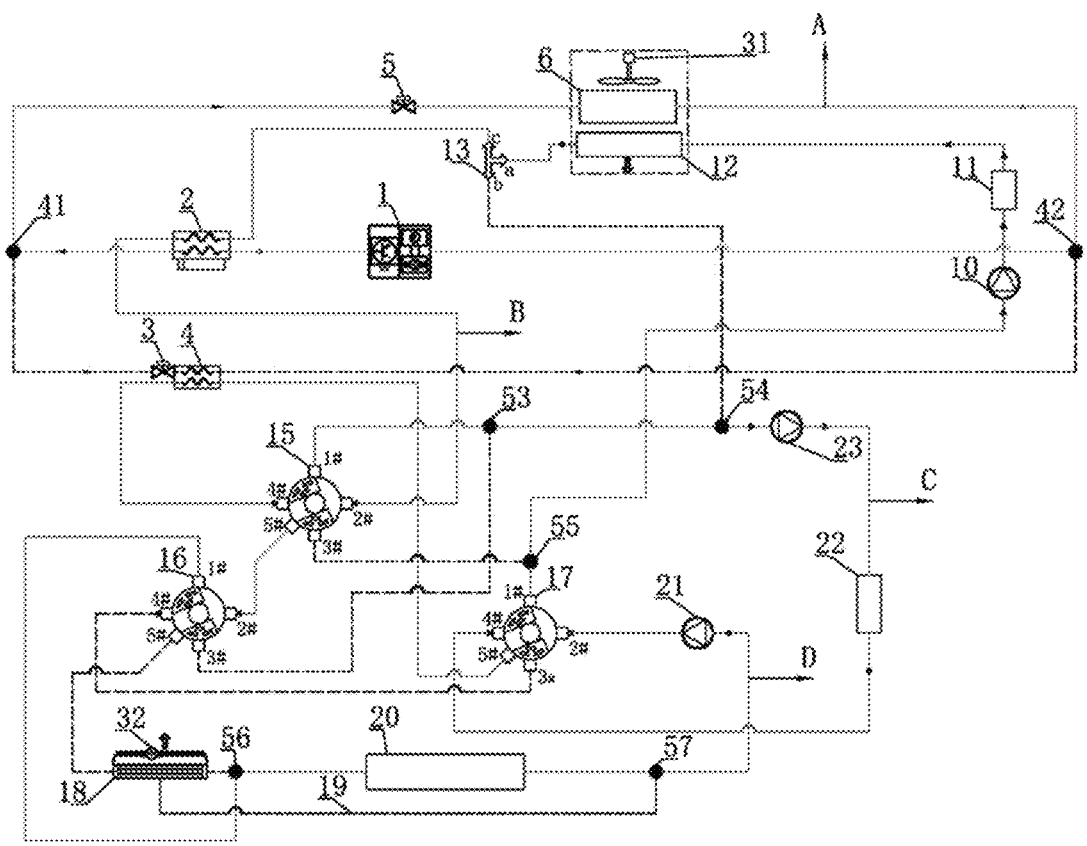
FIG. 19 is a schematic diagram of the 11' mode provided by the embodiment of the invention.

Specifically, as shown in FIG. 19, under 11' mode (passenger compartment demand 3, battery demand 2, motor module demand 1) (battery electric drive in series):

The status of five way water valve, three way water valve, electronic expansion valve and expansion valve with solenoid valve is shown in Table 19:

TABLE 19

| Part name | state |
| --- | --- |
| The first five-way valve 17 | 2#-1# on; 4#-5# on |
| Second five-way valve 15 | 2#-1# on; 4#-5# on |
| Third five-way valve 16 | 2#-1# on; 4#-5# on |
| Three-way water valve 13 | a-b off; a-c on |
| First electronic expansion valve 3 | off |
| Expansion valve with stop valve 5 | on |

Specifically, in refrigerant circulation system A, the refrigerant system consisting of electric compressor 1, water-cooled condenser with receiver & drier 2, expansion valve with solenoid valve 5, evaporator 6 and other main components connected through refrigerant pipes operates, dehumidifies and cools the air through evaporator 6; The coolant circulation system B works jointly with the first thermal management system C and the second thermal management system D. It consists of the first electronic water pump 10, the water ceramic heater 11, the heater 12, the three-way water valve 13, the water-cooled condenser with receiver & drier 2, the second five way valve 15, the second electronic water pump 23, the battery pack 22, the first five way valve 17, the chiller 4, the third five way valve 16, the kettle 19 The main components of the motor and related components 20 are connected through the coolant pipe to form a coolant system for operation; The heat of water-cooled condenser with receiver & drier 2, motor and related components 20 is transferred to battery pack 22; In this way, it not only heats the battery, but also realizes the function or purpose of cooling the motor and related elements 20.

Specifically, mode 12 (passenger compartment demand 4, battery demand 2, motor module demand 1) is the same as mode 11.

Specifically, the 12' mode (passenger compartment demand 4, battery demand 2, motor module demand 1) is the same as the 11' mode.

Figure 20:
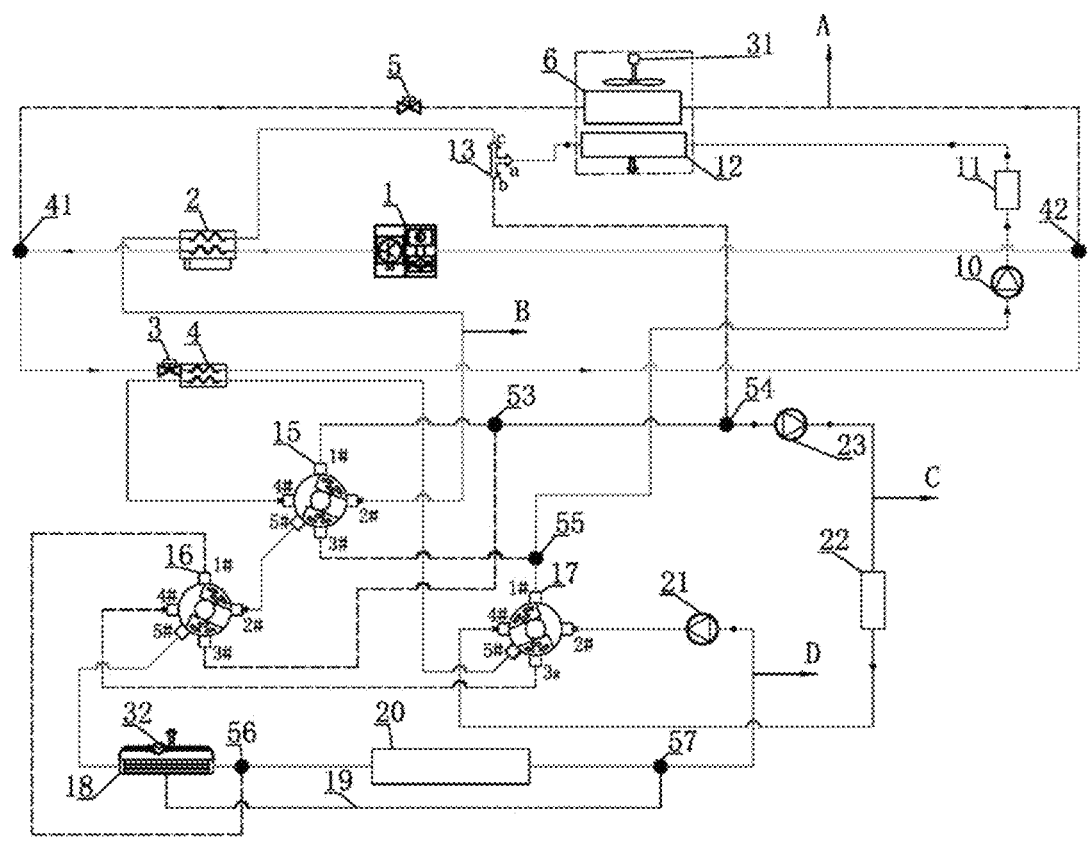
FIG. 20 is a schematic diagram of 13 modes provided by embodiments of the invention.

Specifically, as shown in FIG. 20, under 13 mode (passenger compartment demand 0, battery demand 3, motor module demand 1) (fast charging mode):

The status of five way water valve, three way water valve, electronic expansion valve and expansion valve with solenoid valve is shown in Table 20:

TABLE 20

| Part name | state |
| --- | --- |
| The first five-way valve 17 | 2#-1# on; 4#-5# on |
| Second five-way valve 15 | 2#-5# on; 4#-1# on |
| Third five-way valve 16 | 2#-5# on; 4#-1# on |
| Three-way water valve 13 | a-b off; a-c on |
| First electronic expansion valve 3 | on |
| Expansion valve with stop valve 5 | off |

Specifically, in refrigerant circulation system A, the refrigerant system consisting of electric compressor 1, water-cooled condenser with receiver & drier 2, first electronic expansion valve 3, chiller 4 and other major components connected through refrigerant pipes operates, and chiller 4 cools the coolant; The coolant circulating system B works jointly with the first thermal management system C. The coolant system consists of the first electronic water pump 10, the water ceramic heater 11, the heater 12, the three-way water valve 13, the water-cooled condenser with receiver & drier 2, the second five way valve 15, the third five way valve 16, the low-temperature radiator 18, the kettle 19, the motor and related components 20, the third electronic water pump 21, the first five way valve 17 and other main components connected through the coolant pipe, The water circuit not only dissipate heat the water-cooled condenser with receiver & drier 2, but also dissipate heat the motor and related components 20; The coolant circulation system B works jointly with the first heat management system C. The coolant system consisting of the second electronic water pump 23, battery pack 22, first five way valve 17, chiller 4, second five way valve 15 and other main components is connected through the coolant pipe. The chiller 4 cools the coolant to achieve the function or purpose of cooling the battery.

Specifically, 13' mode (passenger compartment demand 0, battery demand 3, motor module demand 1) is the same as mode 5'.

Figure 21:
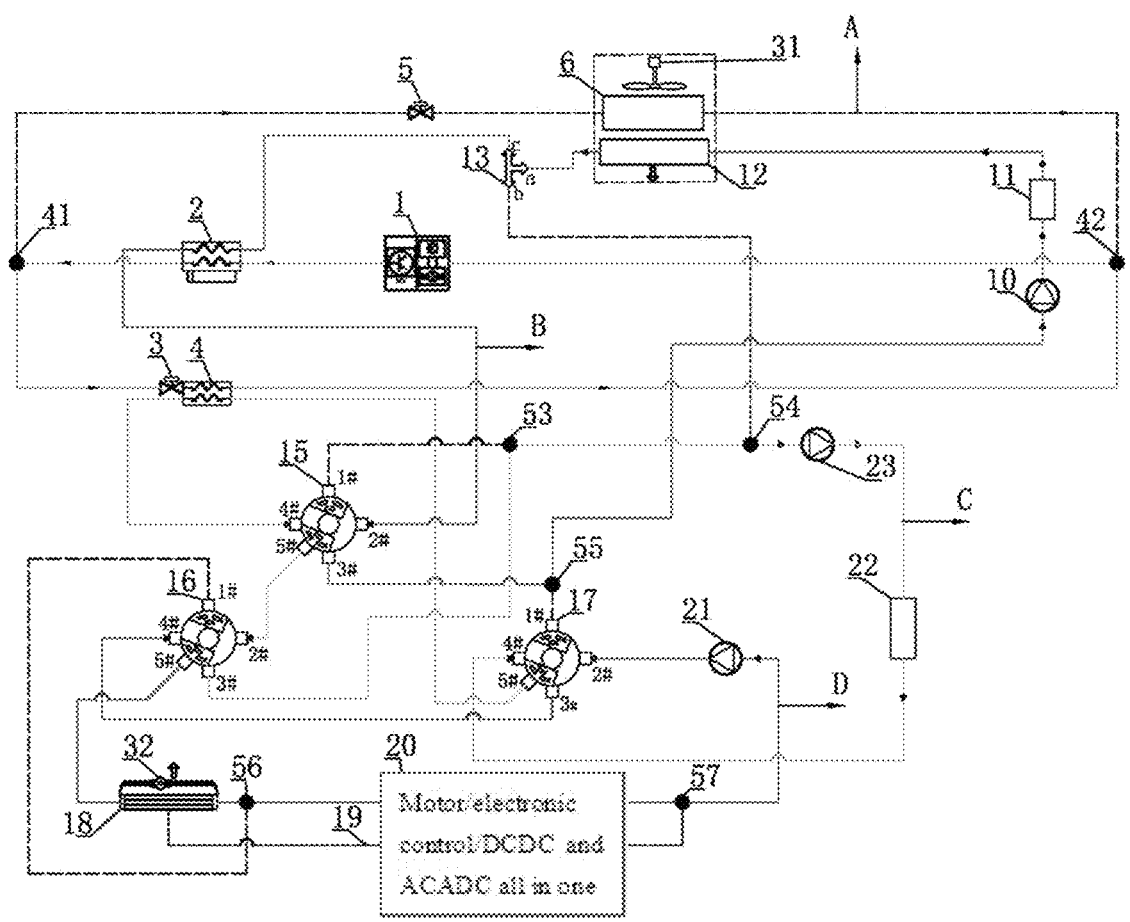
FIG. 21 is a schematic diagram of 14 modes provided by embodiments of the invention.

Specifically, as shown in FIG. 21, under 14 mode (passenger compartment demand 2, battery demand 3, motor module demand 1) (passenger compartment heat pump):

The status of five way water valve, three way water valve, electronic expansion valve and expansion valve with solenoid valve is shown in Table 21:

TABLE 21

| Part name | state |
| --- | --- |
| The first five-way valve 17 | 2#-3# on; 4#-5# on |
| Second five-way valve 15 | 2#-3# on; 4#-5# on |
| Third five-way valve 16 | 2#-3# on; 4#-5# on |
| Three-way water valve 13 | a-b off; a-c on |
| First electronic expansion valve 3 | on |
| Expansion valve with stop valve 5 | off |

Specifically, in the refrigerant circulation system A, the refrigerant system consisting of the electric compressor 1, the water-cooled condenser with receiver & drier 2, the first electronic expansion valve 3, the chiller 4 and other major components is connected through the refrigerant pipe. The heat is transferred to the coolant side of the water-cooled condenser with receiver & drier 2 through the refrigerant side of the water-cooled condenser with receiver & drier 2; In the coolant circulating system B, the coolant system consisting of the first electronic water pump 10, the water ceramic heater 11, the heater 12, the three-way water valve 13, the water-cooled condenser with receiver & drier 2, the second five way valve 15 and other main components is connected through the coolant pipe to operate, transferring the heat of the water-cooled condenser with receiver & drier 2 to the heater 12; The heater 12 heats the air and then blows it out through the blower 31 to realize the heating function or purpose; At the same time, the first heat management system C works together. The coolant system consisting of the second electronic water pump 23, battery pack 22, first five way valve 17, chiller 4, and second five way valve 15 is connected through the coolant pipe. The chiller 4 cools the coolant to achieve the function or purpose of cooling the battery. In addition, the second thermal management system D works jointly. The coolant system consisting of the third electronic water pump 21, the first five way valve 17, the third five way valve 16, the low-temperature radiator 18, the kettle 19, the motor and the related components 20 are connected through the coolant pipe, and heat is dissipated through the low-temperature radiator 18 and the electronic fan 32. The cooled coolant can cool the motor and related components 20; So as to realize the function or purpose of radiating heat to the motor and related elements 20.

Figure 22:
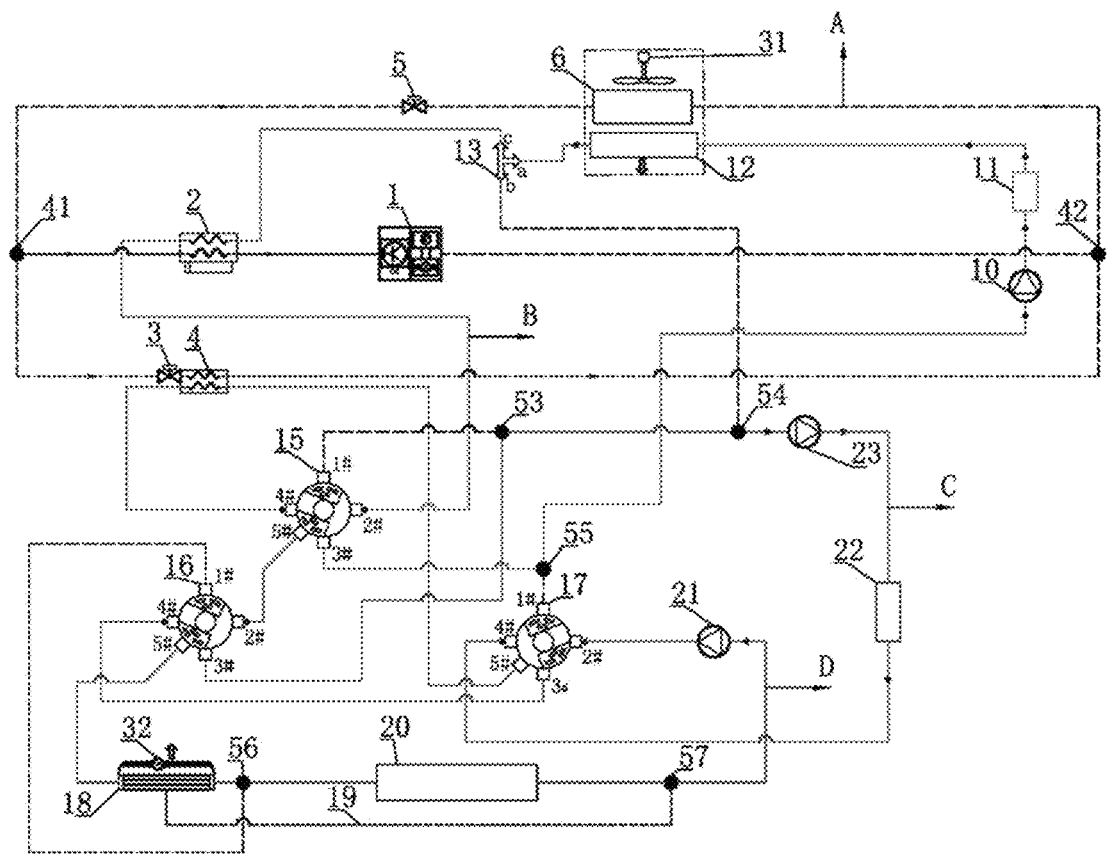
FIG. 22 is a schematic diagram of the 14' mode provided by the embodiment of the invention.

Specifically, as shown in FIG. 22, under 14' mode (passenger compartment demand 2, battery demand 3, motor module demand 1) (water ceramic heater):

The status of five way water valve, three way water valve, electronic expansion valve and expansion valve with solenoid valve is shown in Table 22:

TABLE 22

| Part name | state |
|---|---|
| The first five-way valve 17 | 2#-5# on; 4#-3# on |
| Second five-way valve 15 | 2#-3# on; 4#-5# on |
| Third five-way valve 16 | 2#-3# on; 4#-5# on |
| Three-way water valve 13 | a-b off; a-c on |
| First electronic expansion valve 3 | off |
| Expansion valve with stop valve 5 | off |

Specifically, in the coolant circulating system B, the coolant system consisting of the first electronic water pump 10, the water ceramic heater 11, the heater 12, the three-way water valve 13, the water-cooled condenser with receiver & drier 2, the second five way valve 15 and other major components is connected through the coolant pipe to operate. The water ceramic heater 11 consumes electric energy and transfers heat to the heater 12; The heater 12 heats the air and then blows it out through the blower 31 to realize the heating function or purpose; In addition, the coolant circulating system B, the first thermal management system C, and the second thermal management system D work together, and the coolant system consisting of the third electronic water pump 21, the first five way valve 17, the chiller 4, the second five way valve 15, the third five way valve 16, the second electronic water pump 23, the battery pack 22, the radiator 18, the motor, and the related components 20 is connected through the coolant pipe, and operates through the radiator 18, the electronic fan 32, dissipate heat from the battery and motor separately.

Figure 23:
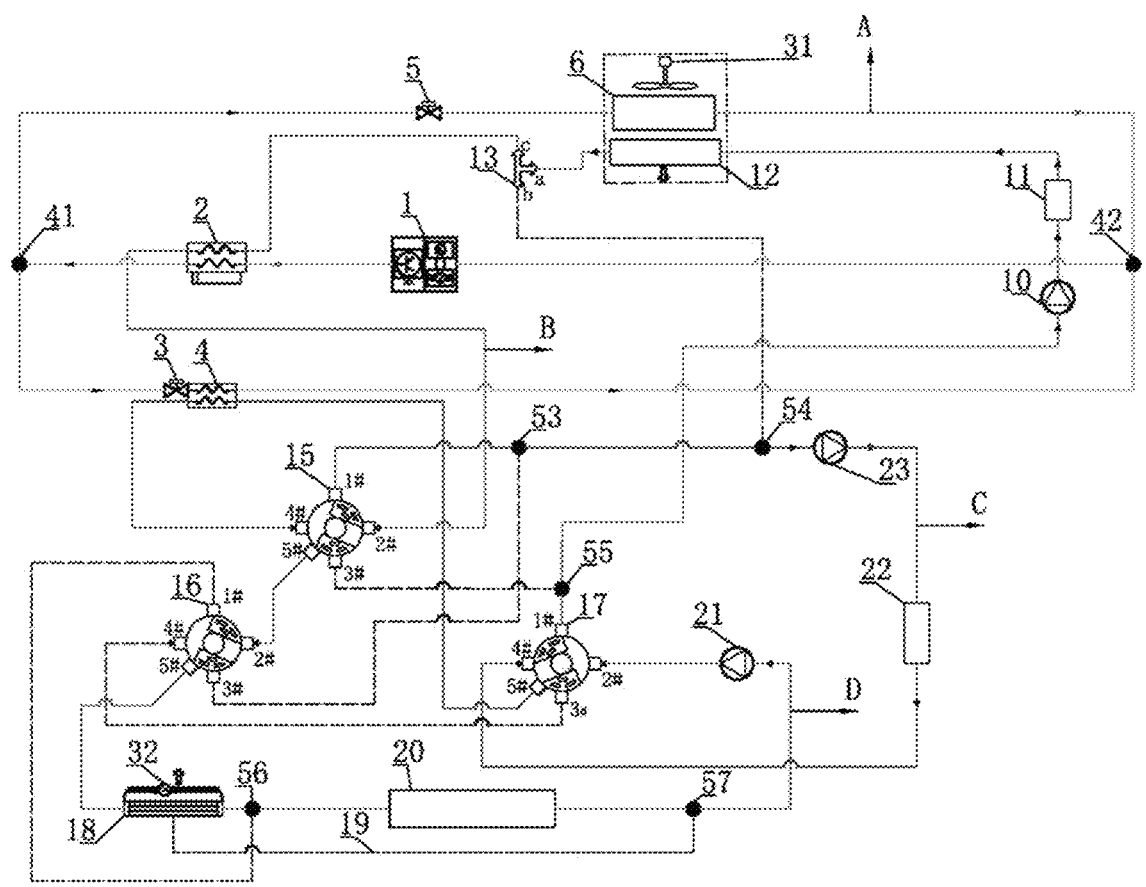
FIG. 23 is a schematic diagram of 15 modes provided by embodiments of the invention.

Specifically, as shown in FIG. 23, under the 15 mode (passenger compartment demand 3, battery demand 3, motor module demand 1), The status of five way water valve, three way water valve, electronic expansion valve and expansion valve with solenoid valve is shown in Table 23:

TABLE 23

| Part name | state |
|---|---|
| The first five-way valve 17 | 2#-1# on; 4#-5# on |
| Second five-way valve 15 | 2#-5# on; 4#-1# on |
| Third five-way valve 16 | 2#-5# on; 4#-1# on |
| Three-way water valve 13 | a-b off; a-c on |
| First electronic expansion valve 3 | on |
| Expansion valve with stop valve 5 | on |

Specifically, in the refrigerant circulation system A, the refrigerant system consisting of the electric compressor 1, the water-cooled condenser with receiver & drier 2, the expansion valve with the solenoid valve 5, the evaporator 6, the first electronic expansion valve 3, the chiller 4 and other main components operates through the connection of the refrigerant pipe, and dehumidifies and cools the air through the evaporator 6; At the same time, the first heat management system C works together. The coolant system consisting of the second electronic water pump 23, battery pack 22, first five way valve 17, chiller 4, and second five way valve 15 is connected through the coolant pipe. The chiller 4 cools to achieve the function or purpose of cooling the battery pack. In addition, the coolant circulating system B works jointly with the second thermal management system D. The coolant system consists of the first electronic water pump 10, the water ceramic heater 11, the heater 12, the three-way water valve 13, the water-cooled condenser with receiver & drier 2, the second five way valve 15, the third five way valve 16, the low-temperature radiator 18, the kettle 19, the motor and related components 20, the third electronic water pump 21, and the first five way valve 17, which are connected through the coolant pipe, Transfer the heat of the water-cooled condenser with receiver & drier 2 to the low-temperature radiator 18, and dissipate heat through the low-temperature radiator 18 and the electronic fan 32; To realize the function or purpose of cooling the motor and related components 20.

Specifically, mode 16 (passenger compartment demand 4, battery demand 3, motor module demand 1) is the same as mode 15.

Figure 24:
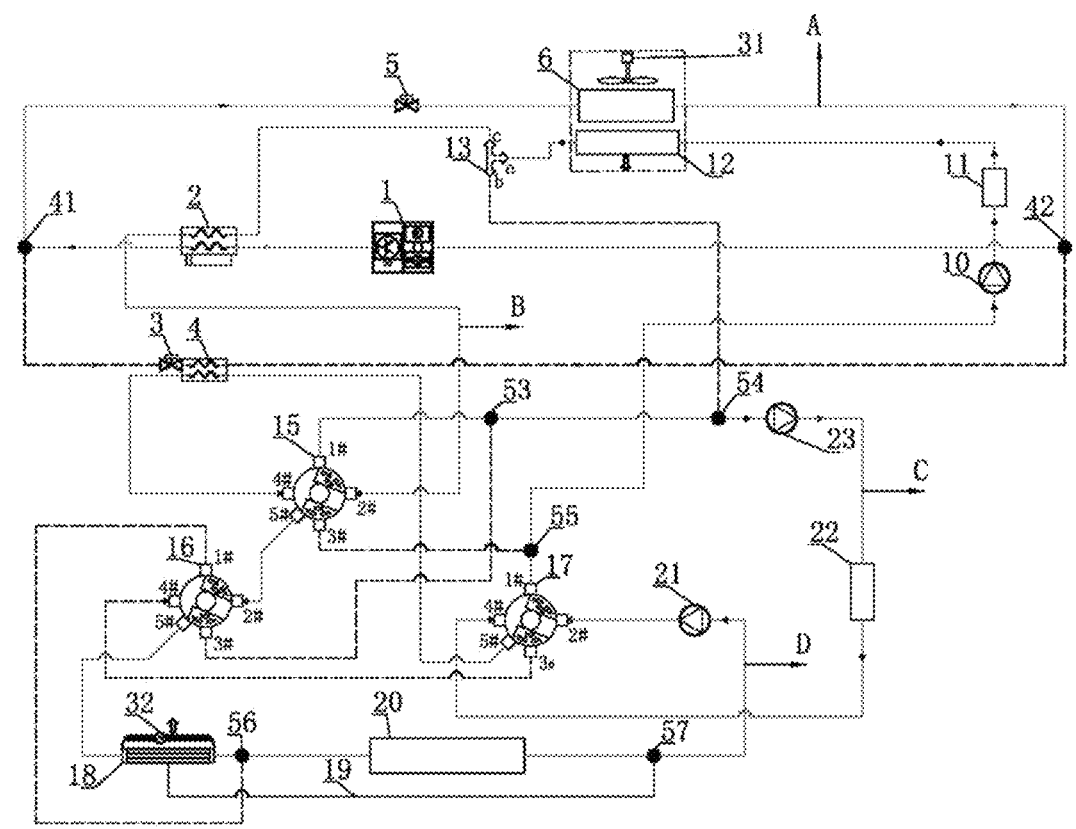
FIG. 24 is a schematic diagram of the 16' mode provided by the embodiment of the invention.

Specifically, as shown in FIG. 24, under 16' mode (passenger compartment demand 4, battery demand 3, motor module demand 1) (battery passive cooling):

The status of five way water valve, three way water valve, electronic expansion valve and expansion valve with solenoid valve is shown in Table 24:

TABLE 24

| Part name | state |
|---|---|
| The first five-way valve 17 | 2#-5# on; 4#-1# on |
| Second five-way valve 15 | 2#-5# on; 4#-1# on |
| Third five-way valve 16 | 2#-5# on; 4#-1# on |
| Three-way water valve 13 | a-b off; a-c on |
| First electronic expansion valve 3 | off |
| Expansion valve with stop valve 5 | on |

Specifically, in refrigerant circulation system A, the refrigerant system consisting of electric compressor 1, water-cooled condenser with receiver & drier 2, expansion valve with solenoid valve 5, evaporator 6 and other main components connected through refrigerant pipes operates, dehumidifies and cools the air through evaporator 6; A part of the heat of the water-cooled condenser with receiver & drier 2 is transferred to the heater 12; The heater 12 heats the air and then blows it out through the blower 31 to realize the heating function or purpose; The coolant circulation system B works jointly with the first thermal management system C and the second thermal management system D. It consists of the first electronic water pump 10, the water ceramic heater 11, the heater 12, the three-way water valve 13, the water-cooled condenser with receiver & drier 2, the second five way valve 15, the third five way valve 16, the low-temperature radiator 18, the water kettle 19, the motor and related components 20, the third electronic water pump 21, the first five way valve 17, the chiller 4, the second electronic water pump 23 The main components such as battery pack 22 are connected through the coolant pipe to form a coolant system for operation; Heat is dissipated through low temperature radiator 18 and electronic fan 32; It can discharge the surplus heat of the water-cooled condenser with receiver & drier 2 and cool the motor and battery.

Figure 25:
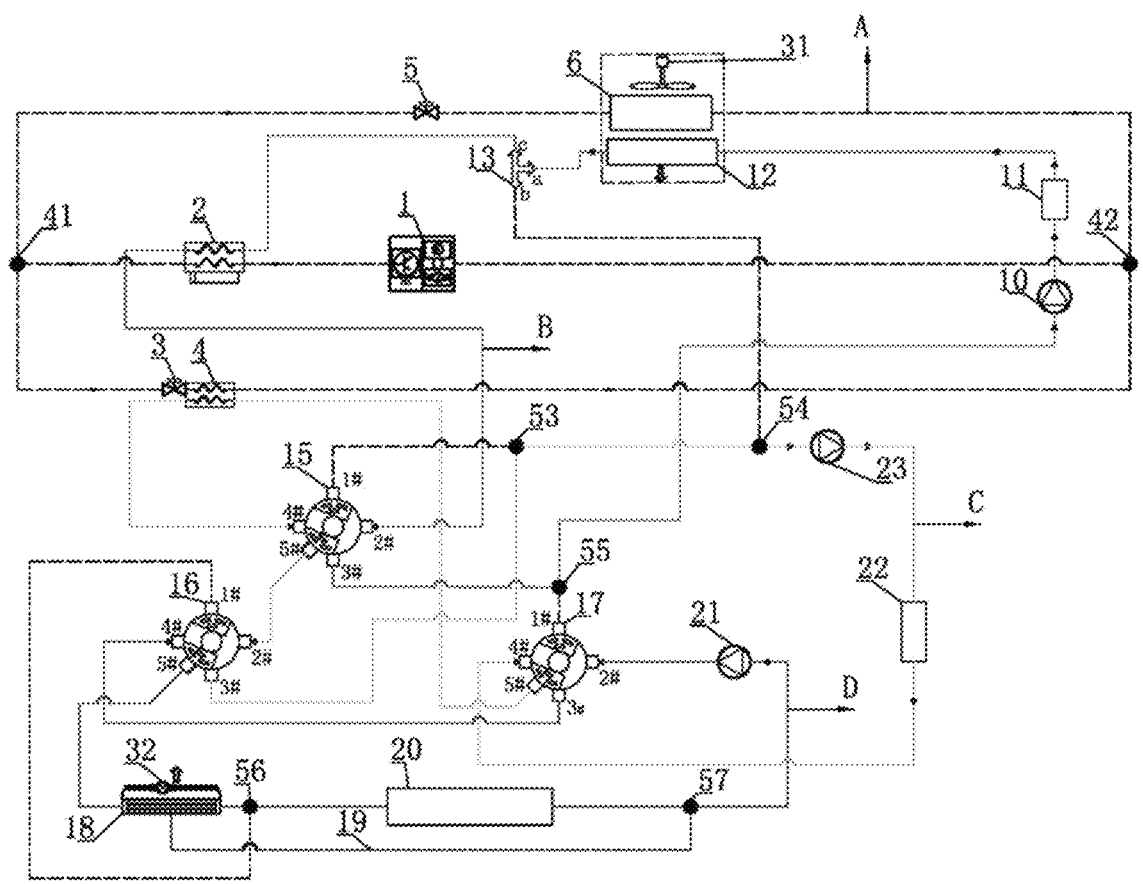
FIG. 25 is a schematic diagram of mode 17 provided by embodiments of the invention.

Specifically, as shown in FIG. 25, under 17 mode (passenger compartment demand 0, battery demand 0, motor module demand 0) (refrigerant filling mode 1):

The status of five way water valve, three way water valve, electronic expansion valve and expansion valve with solenoid valve is shown in Table 25:

TABLE 25

| Part name | state |
| --- | --- |
| The first five-way valve 17 | 2#-3# on; 4#-5# on |
| Second five-way valve 15 | 2#-3# on; 4#-5# on |
| Third five-way valve 16 | 2#-3# on; 4#-5# on |
| Three-way water valve 13 | a-b off; a-c on |
| First electronic expansion valve 3 | off |
| Expansion valve with stop valve 5 | off |

Specifically, in the coolant circulating system B, the coolant system consisting of the first electronic water pump 10, the water ceramic heater 11, the heater 12, the three-way water valve 13, the water-cooled condenser with the receiver & drier 2, the second five way valve 15 and other main components is connected through the coolant pipe to operate; At the same time, the first thermal management system C works jointly, and the coolant system composed of the second electronic water pump 23, battery pack 22, first five way valve 17, chiller 4, second five way valve 15, and third five way valve 16 is connected through the coolant pipe to operate; In addition, the second thermal management system D works separately, and the coolant system consisting of the third electronic water pump 21, the first five way valve 17, the third five way valve 16, the low-temperature radiator 18, the kettle 19, the motor and related components 20 is connected through the coolant pipe to operate; The purpose of filling coolant and venting is achieved.

Figure 26:
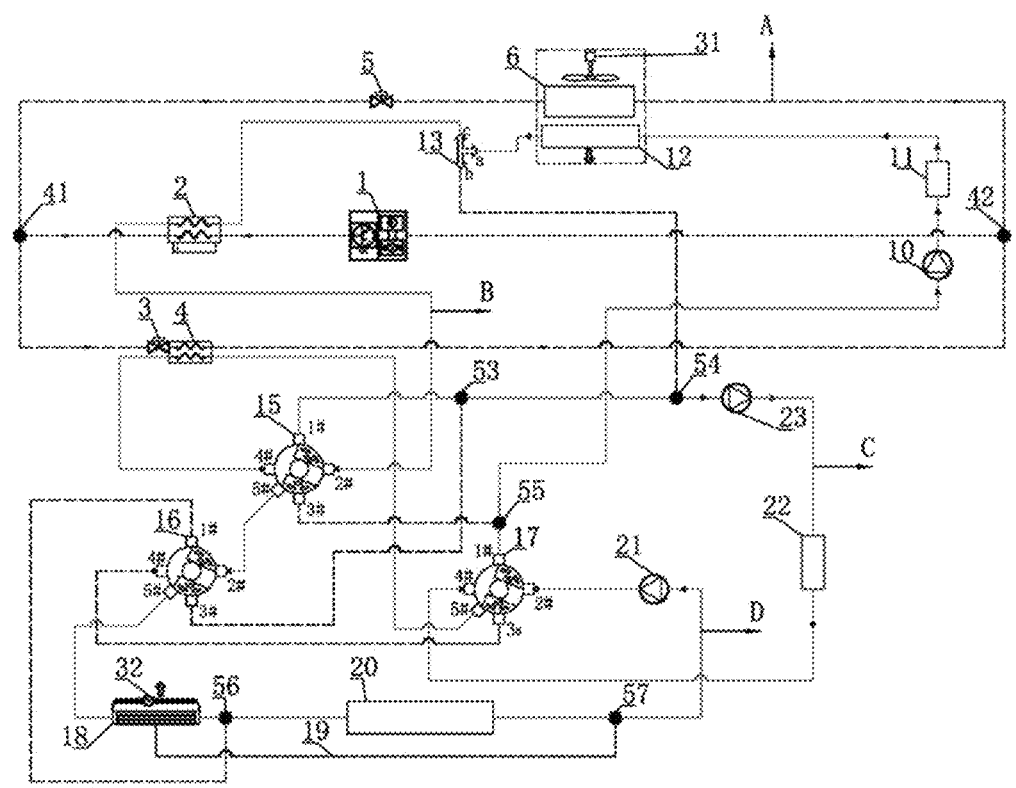
FIG. 26 is a schematic diagram of the 17' mode provided by the embodiment of the invention.
Figure 27:
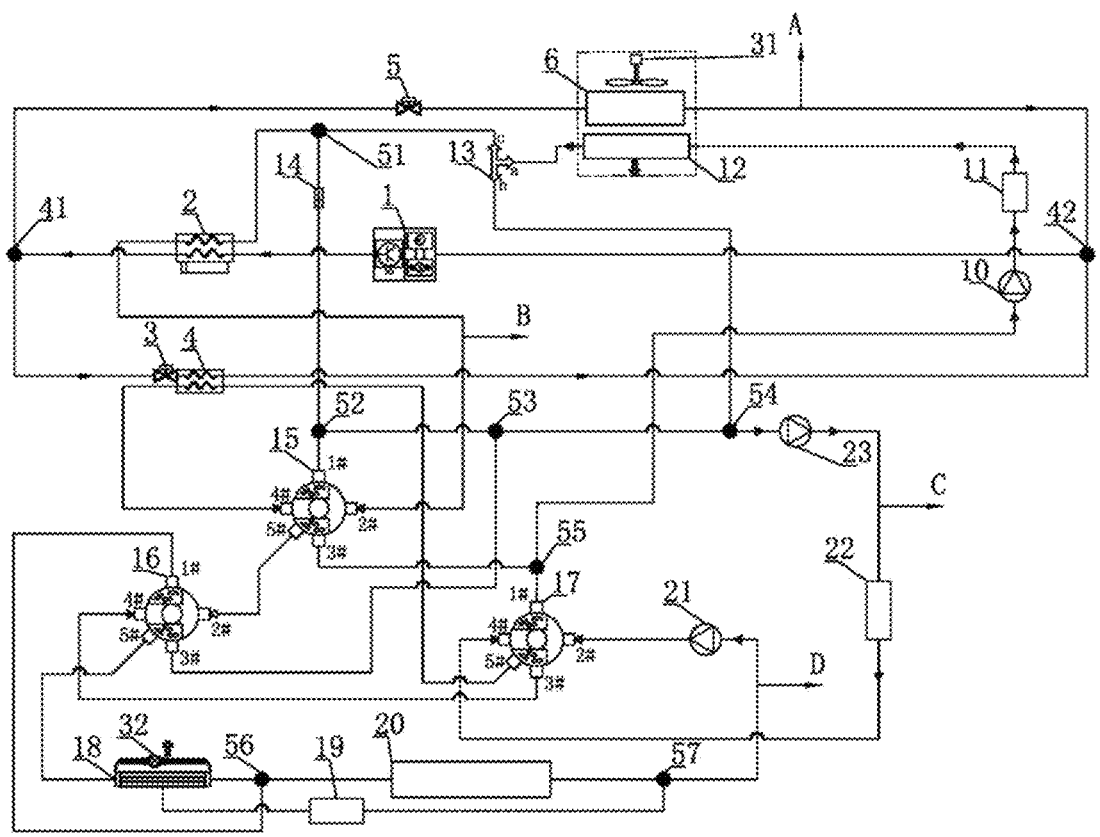
FIG. 27 is a schematic diagram of the first extended principle of an integrated heat pump air conditioning and thermal management system with 3 five-way valves (with a check valve) provided by the embodiment of the invention.

Specifically, as shown in FIG. 26, under 17' mode (passenger compartment demand 0, battery demand 0, motor module demand 0) (refrigerant filling mode 2):

The status of five way water valve, three way water valve, electronic expansion valve and expansion valve with solenoid valve is shown in Table 26:

TABLE 26

| Part name | state |
| --- | --- |
| The first five-way valve 17 | 2#-5# on; 4#-1# on |
| Second five-way valve 15 | 2#-5# on; 4#-1# on |
| Third five-way valve 16 | 2#-5# on; 4#-1# on |
| Three-way water valve 13 | a-b off; a-c on |
| First electronic expansion valve 3 | off |
| Expansion valve with stop valve 5 | on |

Specifically, the coolant circulation system B works jointly with the first thermal management system C and the second thermal management system D. It consists of the first electronic water pump 10, the water ceramic heater 11, the heater 12, the three-way water valve 13, the water-cooled condenser with receiver & drier 2, the second five way valve 15, the third five way valve 16, the low-temperature radiator 18, the kettle 19, the motor and related components 20, the third electronic water pump 21, the first five way valve 17, the chiller 4, the second electronic water pump 23 The main components such as battery pack 22 are connected through the coolant pipe to form a coolant system for operation; The purpose of filling coolant and venting is achieved.

Figure 28:
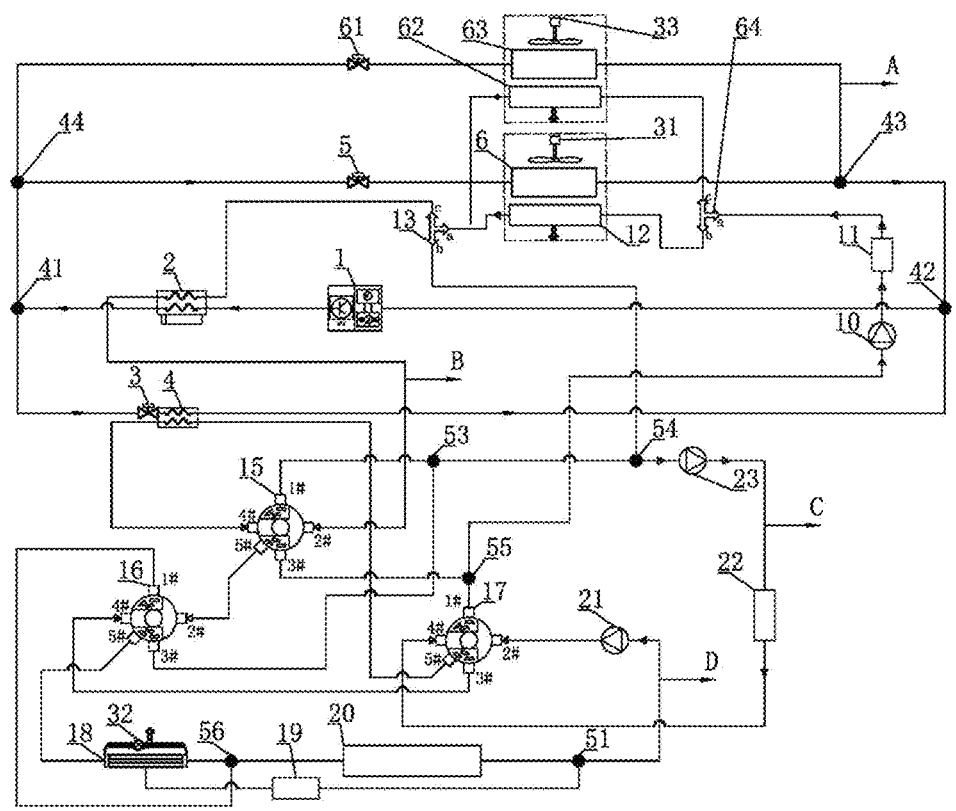
FIG. 28 is the second extension principle diagram of the integrated heat pump air conditioning and thermal management system with five-way valve provided by the embodiment of the invention (with rear air conditioning)
Figure 29:
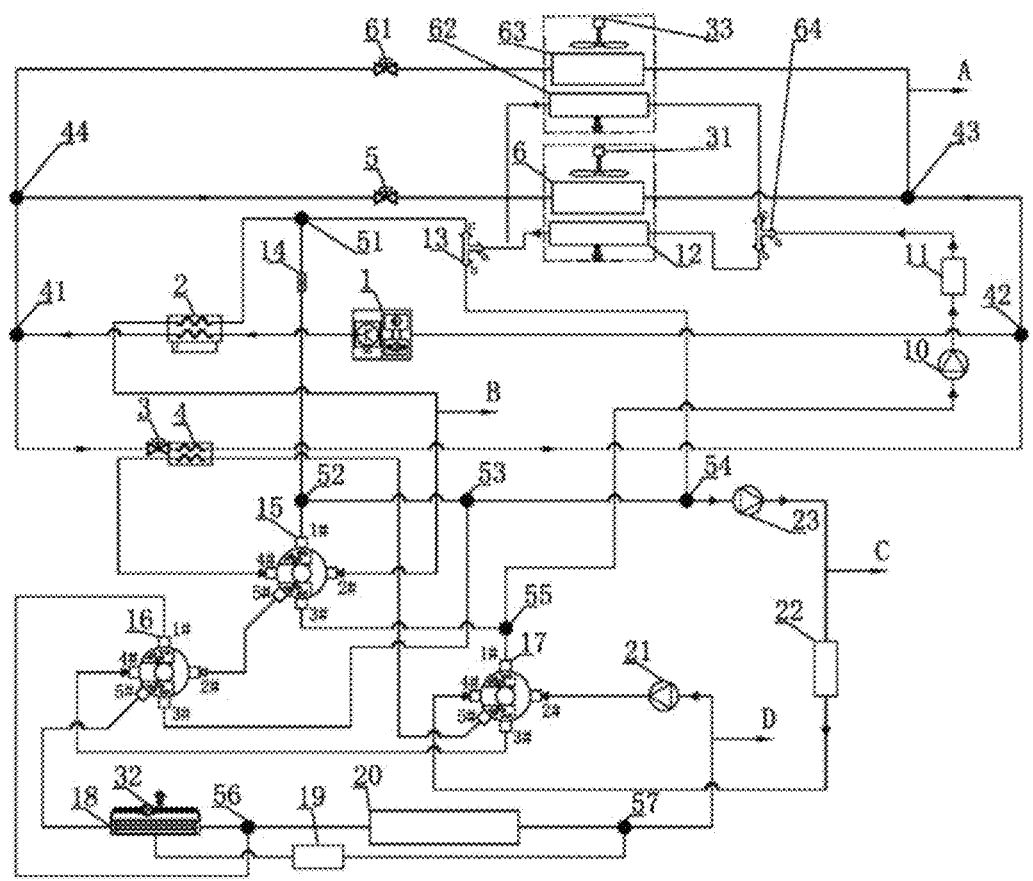
FIG. 29 is the schematic diagram of the third extension principle of the integrated heat pump air conditioning and thermal management system with five-way valve provided by the embodiment of the invention (with check valve & with rear air conditioning)
Figure 30:
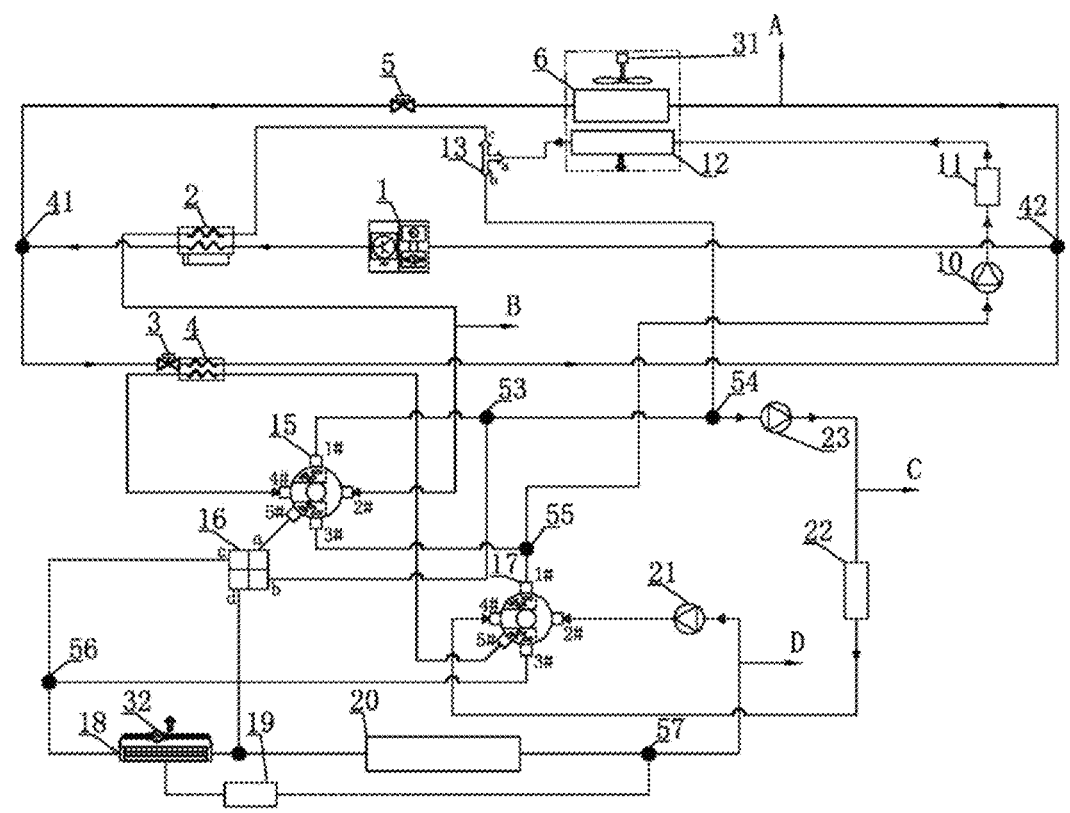
FIG. 30 is a schematic diagram of the fourth expansion principle of the integrated heat pump air conditioning and thermal management system with five-way valve provided by the embodiment of the invention (combination of five-way valve and four-way valve)
Figure 31:
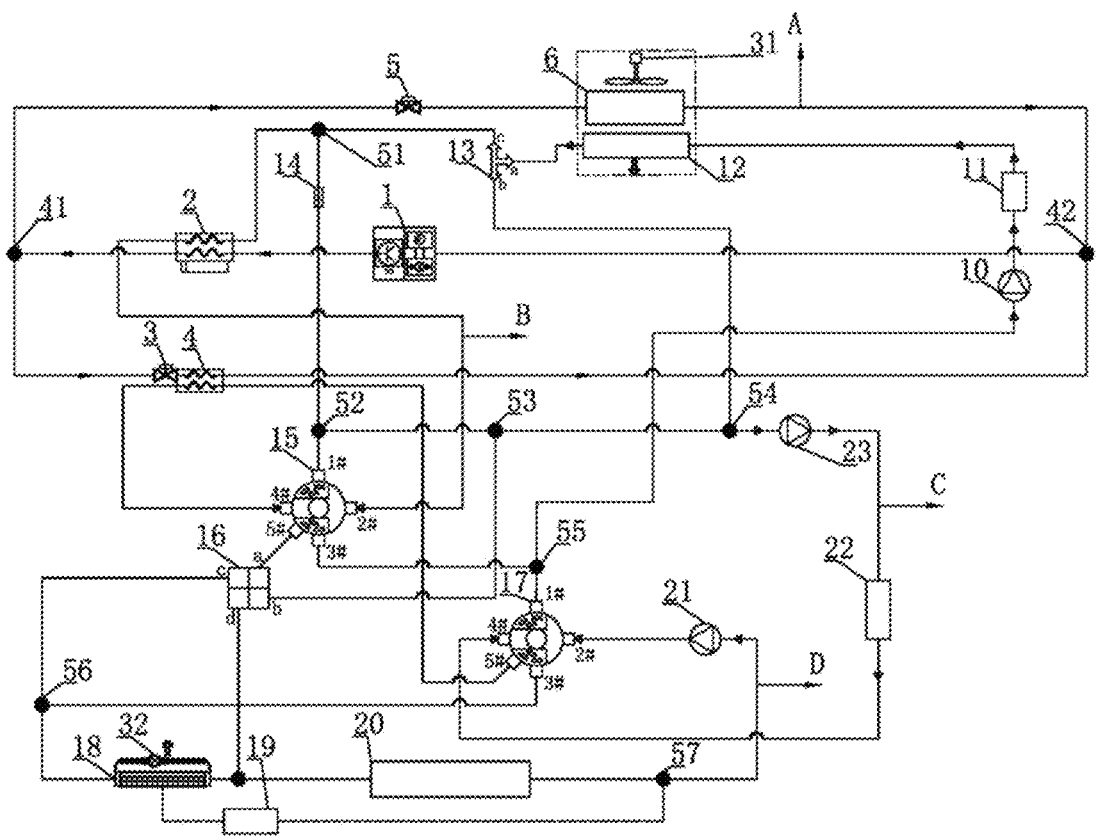
FIG. 31 is the schematic diagram of the fifth extension principle of the integrated heat pump air conditioning and thermal management system with five-way valve provided by the embodiment of the invention (the combination of five-way valve and four-way valve with a check valve)

Specifically, referring to FIGS. 27-31, based on the above embodiments, various changes or equivalent replacements can be made to the features and specific embodiments of the above embodiments. For example, a check valve 14 can be added in combination with FIG. 27; It is also possible to simplify or expand the functions of the above embodiments. As shown in FIGS. 28 and 29, for example, a dual air conditioning system is set, and the second electronic expansion valve 61, the rear evaporator 62, the rear heater 63, the rear blower 33, the third refrigerant tee 43 and the fourth refrigerant tee 44 are added to improve the above system to form a dual air conditioning system for the implementation of the above embodiments. As shown in FIGS. 30 and 31, a four-way valve is used to replace the third five way valve in this scheme.

It can be understood that the refrigerant circulation system, the coolant circulation system, the first heat management system and the second heat management system set in the above embodiments can fully meet the needs of users on the premise of ensuring the heating, cooling, dehumidification and defrosting & demisting functions and comfort of the vehicle air conditioning system. In addition, the system of the invention can freely switch the working mode of the air conditioning system to improve the performance It meets the requirements of various functions and comfort, energy saving, easy assembly, easy maintenance, good durability, high reliability and lightweight, etc. Its control method is intelligent, perfect and reasonable.

Furthermore, in each of the above embodiments, the control method is perfect, reasonable and scientific by combining multiple thermal management functions. At the same time, the integrated module concept is adopted, which can effectively reduce the layout space of the components of the heat pump air conditioning and thermal management system, which is conducive to lightweight, reducing the refrigerant resistance and coolant resistance of the air conditioning system and thermal management system, thus effectively improving the energy efficiency ratio of the air conditioning system, and achieving the goal of energy saving and consumption reduction, It can also ensure good cooling, heating, or ventilation effects.

The integrated heat pump air conditioning and heat management system with five way valve and its control method in each embodiment of the application can be applied to a variety of refrigerants, such as R134a, R1234yf, R290, R744, R410A, R32, etc. The application of each embodiment of the application has broad application value and market prospects.

What is claimed is:

1. An integratable heat pump air-conditioning and thermal management system with five-way valves, characterized by comprising: a refrigerant circulation system (A), a coolant liquid circulation system (B), a first thermal management system (C) and a second thermal management system (D), wherein the refrigerant circulation system (A) is connected to the coolant liquid circulation system (B) to transfer heat and cold energy of a refrigerant to the coolant liquid circulation system (B);

the first thermal management system (C) is connected to the coolant liquid circulation system (B), the first thermal management system (C) being used for cooling and heating a battery pack; and the second thermal management system (D) is connected to the coolant liquid circulation system (B), the second thermal management system (D) being used for cooling an electric motor, and the second thermal management system (D) also being used for dissipating waste heat from the coolant liquid circulation system (B) and the first thermal management system (C) into the air;

the refrigerant circulation system (A) comprises an electric compressor (1), a water-cooled condenser with receiver & drier (2), a first electronic expansion valve (3), a chiller (4), an expansion valve with solenoid valve (5), an evaporator (6), a blower (31), a first refrigerant tee (41) and a second refrigerant tee (42), wherein an discharge end of the electric compressor (1) is connected to an inlet end of the water-cooled condenser with receiver & drier (2), an outlet end of the water-cooled condenser with receiver & drier (2) is connected to an inlet end of the first refrigerant tee (41), an outlet end of the first refrigerant tee (41) is connected to an inlet end of the first electronic expansion valve (3), an outlet end of the first electronic expansion valve (3) is connected to an inlet end of the chiller (4), an outlet end of the chiller (4) is connected to an inlet end of the second refrigerant tee (42), an outlet end of the first refrigerant tee (41) is connected to an inlet end of the expansion valve with solenoid valve (5), an outlet end of the expansion valve with solenoid valve (5) is connected to an inlet end of the evaporator (6), an outlet end of the evaporator (6) is connected to an inlet end of the second refrigerant tee (42), and an outlet end of the second refrigerant tee (42) is connected to a suction end of the electric compressor (1);

the coolant liquid circulation system (B) comprises a first electronic water pump (10), a ceramic water heater (11), a heater (12), a three-way water valve (13), a second five-way valve (15), a third five-way valve (16), a first five-way valve (17), a first water tee (53) and a third water tee (55), wherein an outlet end of the first electronic water pump (10) is connected to an inlet end of the ceramic water heater (11), and an outlet end of the ceramic water heater (11) is connected to an inlet end of the heater (12); an outlet end of the heater (12) is connected to an end a of the three-way water valve (13); an end b of the three-way water valve (13) is connected to one end of the second water tee (54); an end c of the three-way water valve (13) is connected to a coolant liquid inlet end of the water-cooled condenser with receiver & drier (2); a coolant liquid outlet end of the water-cooled condenser with receiver & drier (2) is connected to an inlet end 2 #of the second five-way valve (15); one end of the first water tee (53) is connected to an outlet end 1 #of the second five-way valve (15); an outlet end 3 #of the second five-way valve (15) is connected to one end of the third water tee (55); one end of the third water tee (55) is connected to an outlet end 1 #of the first five-way valve (17); an outlet end 5 #of the first five-way valve (17) is connected to a coolant liquid inlet end of the chiller (4); a coolant liquid outlet end of the chiller (4) is connected to an inlet end 4 #of the second five-way valve (15); an outlet end 5 #of the second five-way valve (15) is connected to an end 2 #of the third five-way valve (16); an end 3 #of the third five-way valve (16) is connected to one end of the first water tee (53); one end of the first water tee (53) is connected to one end of the second water tee (54); and one end of the third water tee (55) is connected to an inlet end of the first electronic water pump (10), and the blower (31) is arranged on the side of a vent of the evaporator (12).

2. The integratable heat pump air-conditioning and thermal management system with five-way valves according to claim 1, characterized in that the first thermal management system (C) comprises a second electronic water pump (23), a battery pack (22) and a second water tee (54), wherein an outlet end of the second electronic water pump (23) is connected to an inlet end of the battery pack (22); an outlet end of the battery pack (22) is connected to an inlet end 4 #of the first five-way valve (17); and one end of the second water tee (54) is connected to the second electronic water pump (23).

3. The integratable heat pump air-conditioning and thermal management system with five-way valves according to claim 2, characterized in that the second thermal management system (D) comprises a third electronic water pump (21), a low-temperature radiator (18), an electronic fan (32), a fourth water tee (56), a water replenishing kettle (19), an electric motor and related element (20) and a fifth water tee (57), wherein an outlet end of the third electronic water pump (21) is connected to an inlet end 2 #of the first five-way valve (17); an outlet end 3 #of the first five-way valve (17) is connected to an inlet end 4 #of the third five-way valve (16); an outlet end 5 #of the third five-way valve (16) is connected to an inlet end of the low-temperature radiator (18); an outlet end of the low-temperature radiator (18) is connected to one end of the fourth water tee (56); the outlet end of the low-temperature radiator (18) is connected to one end of the water replenishing kettle (19); the other end of the water replenishing kettle (19) is connected to one end of the fifth water tee (57); an outlet end 1 #of the third five-way valve (16) is connected to one end of the fourth water tee (56); one end of the fourth water tee (56) is connected to an inlet end of the electric motor and related element (20); an outlet end of the electric motor and related element (20) is connected to one end of the fifth water tee (57); one end of the fifth water tee (57) is connected to an inlet end of the third electronic water pump (21); and the electronic fan (32) is arranged on the side of a vent of the low-temperature radiator (18).

4. A control method of an integratable heat pump air-conditioning and thermal management system with five-way valves, characterized in that the control method is implemented using the integratable heat pump air-conditioning and thermal management system with five-way valves according to claim 1, comprising:

setting a plurality of operating modes according to user requirements, and controlling operating states of the integratable heat pump air-conditioning and thermal management system with five-way valves on the basis of the determined different operating modes.

5. The control method of an integratable heat pump air-conditioning and thermal management system with five-way valves according to claim 4, characterized in that in setting a plurality of operating modes according to user requirements, passenger compartment demand, battery demand and electric motor module demand are obtained respectively, and different operating modes are set according to the different passenger compartment demand, battery demand and motor and related element demand obtained, wherein the motor and related element demand refers to all-in-one demand of an electric motor, an electronic control module, an ACDC module and a DCAC module.

6. The control method of an integratable heat pump air-conditioning and thermal management system with five-way valves according to claim 5, characterized in that in the passenger compartment demand, 0 represents no demand or ventilation, 2 represents heating, 3 represents cooling, and 4 represents heating and dehumidification;

in the battery demand, 0 represents no demand, 1 represents temperature equalization, 2 represents heating, and 3 represents cooling;

in the electric motor module demand, 0 represents no demand, and 1 represents heat dissipation; and the operating modes set according to the different passenger compartment demand, battery demand and electric motor module demand are mode 1 to mode 17' respectively.

7. The control method of an integratable heat pump air-conditioning and thermal management system with five-way valves according to claim 6, characterized in that the mode 1 to mode 17' that are set are specified as:

mode 1: passenger compartment demand 0, battery demand 0, and electric motor module demand 1;

mode 1': passenger compartment demand 0, battery demand 0, and electric motor module demand 1;

mode 2: passenger compartment demand 2, battery demand 0, and electric motor module demand 1;

mode 2': passenger compartment demand 2, battery demand 0, and electric motor module demand 1;

mode 3: passenger compartment demand 3, battery demand 0, and electric motor module demand 1;

mode 4: passenger compartment demand 4, battery demand 0, and electric motor module demand 1;

mode 4': passenger compartment demand 4, battery demand 0, and electric motor module demand 1;

mode 5: passenger compartment demand 0, battery demand 1, and electric motor module demand 1;

mode 5': passenger compartment demand 0, battery demand 1, and electric motor module demand 1;

mode 6: passenger compartment demand 2, battery demand 1, and electric motor module demand 1;

mode 6': passenger compartment demand 2, battery demand 1, and electric motor module demand 1;

mode 7: passenger compartment demand 3, battery demand 1, and electric motor module demand 1;

mode 8: passenger compartment demand 4, battery demand 1, and electric motor module demand 1;

mode 8': passenger compartment demand 4, battery demand 1, and electric motor module demand 1;

mode 9: passenger compartment demand 0, battery demand 2, and electric motor module demand 1;

mode 9': passenger compartment demand 0, battery demand 2, and electric motor module demand 1;

mode 10: passenger compartment demand 2, battery demand 2, and electric motor module demand 1;

mode 10': passenger compartment demand 2, battery demand 2, and electric motor module demand 1;

mode 11: passenger compartment demand 3, battery demand 2, and electric motor module demand 1;

mode 11': passenger compartment demand 3, battery demand 2, and electric motor module demand 1;

mode 12: passenger compartment demand 4, battery demand 2, and electric motor module demand 1;

mode 12': passenger compartment demand 4, battery demand 2, and electric motor module demand 1;

mode 13: passenger compartment demand 0, battery demand 3, and electric motor module demand 1;

mode 13': passenger compartment demand 0, battery demand 3, and electric motor module demand 1;

mode 14: passenger compartment demand 2, battery demand 3, and electric motor module demand 1;

mode 14': passenger compartment demand 2, battery demand 3, and electric motor module demand 1;

mode 15: passenger compartment demand 3, battery demand 3, and electric motor module demand 1;

mode 16: passenger compartment demand 4, battery demand 3, and electric motor module demand 1;

mode 16': passenger compartment demand 4, battery demand 3, and electric motor module demand 1;

mode 17: passenger compartment demand 0, battery demand 0, and electric motor module demand 0; and mode 17': passenger compartment demand 0, battery demand 0, and electric motor module demand 0.

8. The control method of an integratable heat pump air-conditioning and thermal management system with five-way valves according to claim 6, characterized in that operating states of a refrigerant circulation system, a coolant liquid circulation system, a first thermal management system and a second thermal management system in the integratable heat pump air-conditioning and thermal management system with five-way valves are adjusted respectively on the basis of the mode 1 to mode 17' that are set.

* * * * *